US009442618B2

(12) United States Patent
Neuert et al.

(10) Patent No.: US 9,442,618 B2
(45) Date of Patent: Sep. 13, 2016

(54) MOBILE DEVICE INTERFACE GENERATOR

(71) Applicants: Holger Neuert, Wiesenbach (DE); Michael Hoerisch, Heidelberg (DE); Stefan Breitkopf, St. Leon-Rot (DE)

(72) Inventors: Holger Neuert, Wiesenbach (DE); Michael Hoerisch, Heidelberg (DE); Stefan Breitkopf, St. Leon-Rot (DE)

(73) Assignee: SAP SE, Walldorf (DE)

( * ) Notice: Subject to any disclaimer, the term of this patent is extended or adjusted under 35 U.S.C. 154(b) by 802 days.

(21) Appl. No.: 13/621,548

(22) Filed: Sep. 17, 2012

(65) Prior Publication Data
US 2014/0082512 A1    Mar. 20, 2014

(51) Int. Cl.
G06F 3/048    (2013.01)
G06F 3/14    (2006.01)

(52) U.S. Cl.
CPC .............. G06F 3/048 (2013.01); G06F 3/14 (2013.01); G09G 2370/022 (2013.01)

(58) Field of Classification Search
CPC .... G06F 3/048; G06F 3/14; G06G 2370/022
USPC .................................................. 715/744, 770
See application file for complete search history.

(56) References Cited

U.S. PATENT DOCUMENTS

| 6,389,462 | B1* | 5/2002 | Cohen | H04L 29/06 707/999.01 |
| 6,738,804 | B1* | 5/2004 | Lo | G06F 17/30905 707/E17.121 |
| 9,158,434 | B2* | 10/2015 | Beveridge | G06F 17/30899 |
| 9,225,763 | B2* | 12/2015 | Baird | H04L 67/38 |
| 9,250,854 | B2* | 2/2016 | Beveridge | G06F 9/4445 |
| 9,355,081 | B2* | 5/2016 | Zhang | G06F 17/30893 |
| 2008/0139195 | A1* | 6/2008 | Marsyla | H04W 24/10 455/423 |
| 2011/0061046 | A1* | 3/2011 | Phillips | G06F 9/45533 717/176 |
| 2011/0197132 | A1* | 8/2011 | Escoda et al. | 715/733 |
| 2012/0013547 | A1* | 1/2012 | Tsirkin et al. | 345/173 |
| 2012/0096345 | A1* | 4/2012 | Ho | G06F 3/017 715/252 |
| 2012/0226985 | A1* | 9/2012 | Chervets et al. | 715/735 |
| 2012/0284632 | A1* | 11/2012 | Baird | G06F 9/4445 715/749 |

OTHER PUBLICATIONS

"Accelerate application migration and simplify application management", © 1999-2012 Citrix Systems, Inc, [Online]. Retrieved from the Internet: <URL: http://www.citrix.com/English/ps2/products/product.asp?contentID=2318680&ntref=prod_cat>, (Accessed Jun. 20, 2012), 3 pgs.

"Apple iPad Means Business with VMware View™ Virtual Desktops", Copyright © 2012 VMware, Inc., [Online]. Retrieved from the Internet: <URL: http://www.vmware.com/company/news/releases/view-ipad-3-9.html>, (Accessed Jun. 20, 2012), 2 pgs.

(Continued)

Primary Examiner — David Phantana Angkool
(74) Attorney, Agent, or Firm — Schwegman Lundberg & Woessner, P.A.

(57) ABSTRACT

A mobile device and method includes receiving communications from an application server at a touchscreen based mobile device, wherein the communications are tailored for providing a user interface for a workstation computer system, translating the received communications at the mobile device into a mobile device user interface tailored for the mobile device touchscreen, receiving user interactions via the mobile device touchscreen, translating the received user interactions into corresponding workstation based user interactions, and transmitting the translated user interaction to the application server such that the application server interacts with the mobile device in the same manner as with workstations.

20 Claims, 19 Drawing Sheets

(56) References Cited

OTHER PUBLICATIONS

"Atomic Web Browser", 2010 Atomic Web Browser, [Online]. Retrieved from the Internet: <URL: http://atomicwebbrowser.com/?p=120>, (Accessed Jun. 21, 2012), 3 pgs.

"Client Hyper-V", © 2012 Microsoft, [Online]. Retrieved from the Internet: <URL: http://technet.microsoft.com/en-us/library/hh857623.aspx>, (Accessed Jun. 21, 2012), 5 pgs.

"Deliver Desktop Services from Your Cloud for End-User Freedom & IT Control", Copyright © 2012 VMware, Inc, [Online]. Retrieved from the Internet: <URL: http://www.vmware.com/products/view/overview.html>, (Accessed Jun. 20, 2012), 2 pgs.

"Deliver desktops and apps on-demand to every user", © 1999-2012 Citrix Systems, Inc, [Online]. Retrieved from the Internet: <URL: http://www.citrix.com/English/ps2/products/product.asp?contentID=163057&ntref=prod_cat>, (Accessed Jun. 20, 2012), 2 pgs.

"Edovia—Screens", © 2008-2012 Edovia Inc., [Online]. Retrieved from the Internet: <URL: http://edovia.com/en/screens.html>, (Accessed Jun. 21, 2012), 6 pgs.

"Enterprise Desktop virtualization, virtual desktops—Citrix XenClient", © 1999-2012 Citrix Systems, Inc., [Online]. Retrieved from the Internet: <URL: http://www.citrix.com/English/ps2/products/product.asp?contentID=2300325&ntref=prod_cat>, (Accessed Jun. 20, 2012).

"Enterprise-wide Managed Access to WS03, WS08, WS08 R2, VDI Desktops, and Legacy Hosts", Copyright© 2012 Ericom® Software. A, [Online]. Retrieved from the Internet: <URL: http://www.ericom.com/webconnect_enterprise.asp>, (Accessed Jun. 20, 2012), 2 pgs.

"Ericom Software Ericom RDP Client for iPad, iPhone and iPod Touch", Copyright© 2012 Ericom® Software., [Online]. Retrieved from the Internet: <URL: http://www.ericom.com/ipad-iphone.asp>, (Accessed Jun. 20, 2012), 2 pgs.

"Fast, easy access to everything you need from any device", © 1999-2012 Citrix Systems, Inc., [Online]. Retrieved from the Internet: <URL: http://www.citrix.com/English/ps2/products/product.asp?contentID=1689163&ntref=prod_cat>, (Accessed Jun. 20, 2012), 3 pgs.

"GoToMyPC by Citrix", © 1999-2012 Citrix Systems, Inc., [Online]. Retriieved from the Internet: <URL: http://www.citrix.com/English/ps2/products/product.asp?contentID=13994&ntref=prod_cat, (Accessed Jul. 20, 2012), 3 pgs.

"iCab Mobile FAQ", © 1999-2010 Alexander Clauss, [Online]. Retrieved from the Internet: <URL: http://www.icab.de/mobileFAQ.html>, (Accessed Jun. 21, 2012), 3 pgs.

"iRdesktop", Copyright © 2011 Apple Inc., [Online]. Retrieved from the Internet: <URL: http://itunes.apple.com/us/app/irdesktop/id311467740?mt=8>, (Accesses Jun. 21, 2012), 4 pgs.

"iTap mobile RDP (Remote Desktop for Windows)", Copyright © 2011 Apple Inc., [Online]. Retrieved from the Internet: <URL: http://itunes.apple.com/us/app/itap-mobile-rdp-remote-desktop/id317062064?mt=8>, (Accessed Jun. 21, 2012), 4 pgs.

"iTeleport", [Online]. Retrieved from the Internet: <URL: http://www.iteleportmobile.com/>, (Accessed Jun. 21, 2012), 2 pgs.

"Microsoft Application Virtualization (App-V)", © 2012 Microsoft, [Online]. Retrieved from the Internet: <URL: http://www.microsoft.com/en-us/windows/enterprise/products-and-technologies/virtualization/app-v.aspx>, (Accessed Jun. 21, 2012), 4 pgs.

"Microsoft Desktop Virtualization", © 2012 Microsoft, [Online]. Retrieved from the Internet: <URL: http://www.microsoft.com/en-us/windows/enterprise/products-and-technologies/virtualization/default.aspx>, (Accessed Jun. 21, 2012), 4 pgs.

"Microsoft Enterprise Desktop Virtualization (MED-V)", © 2012 Microsoft, [Online]. Retrieved from the Internet: <URL: http://www.microsoft.com/en-us/windows/enterprise/products-and-technologies/virtualization/med-v.aspx>, (Accessed Jun. 21, 2012), 3 pgs.

"Microsoft User Experience Virtualization (UE-V)", © 2012 Microsoft, [Online]. Retrieved from the Internet: <URL: http://www.microsoft.com/en-us/windows/enterprise/products-and-technologies/virtualization/UE-V.aspx>, (Accessed Jun. 21, 2012), 4 pgs.

"Mocha VNC for iPhone and iPad", Copyright (c) 1997-2012 MochaSoft Aps., [Online]. Retrieved from the Internet: <URL: http://mochasoft.dk/iphone_vnc.htm>, (Accessed Jun. 21, 2012), 2 pgs.

"On-Demand Application Delivery", © 1999-2012 Citrix Systems, Inc, [Online]. Retrieved from the Internet: <URL: http://www.citrix.com/English/ps2/products/product.asp?contentID=186&ntref=prod_cat>, (Accessed Jun. 20, 2012), 2 pgs.

"On-demand virtual application delivery—Citrix XenApp", © 1999-2012 CitrixSystems, Inc., [Online]. Retrieved from the Internet: <URL: http://www.citrix.com/English/ps2/products/product.asp?contentID=186&ntref=prod_cat>, (Accessed Jun. 20, 2012), 3 pgs.

"Parallels Desktop Virtualization", © 1999-2012 Parallels Holdings Ltd, [Online]. Retrieved from the Internet: <URL: http://www.parallels.com/products/desktop-virtualization/>, (Accessed Jun. 21, 2012), 8 pgs.

"Parallels Mobile", © 1999-2012 Parallels Holdings Ltd., [Online]. Retrieved from the Internet: <URL: http://www.parallels.com/products/mobile/>, (Accessed Jun. 21, 2012), 8 pgs.

"PowerTerm WebConnect RemoteView—Application & Desktop Management Citrix Alternative", Copyright© 2012 Ericom® Software., [Online]. Retrieved from the Internet: <URL: http://www.ericom.com/webconnect_remoteview.asp>, (Accessed Jun. 20, 2012), 2 pgs.

"Remote Desktop Services", Wikipedia®, [Online]. Retrieved from the Internet: <URL: http://en.wikipedia.org/wiki/Remote_Desktop_Services>, (Accessed Jun. 21, 2012), 8 pgs.

"Stackoverflow", © 2012 stack exchange inc; user contributions licensed under cc-wiki, [Online]. Retrieved from the Internet: <URL: http://stackoverflow.com/questions/9456627/advice-in-creating-an-ios-app-for-the-front-end-of-an-existing-database>, (Accessed Jun. 21, 2012), 2 pgs.

"TechAirlines", Copyright © 2009-2012 TechAirlines., [Online]. Retrieved from the Internet: <URL: http://www.techairlines.com/2011/06/27/ios-user-agent-mobile-browsers/>, (Accessed Jun. 21, 2012), 10 pgs.

"The Alternative to Citrix—Ericom PowerTerm WebConnect", Copyright© 2012 Ericom® Software, [Online]. Retrieved from the Internet: <URL: http://www.ericom.com/Ericom_vs_citrix.asp.>, (Accessed Jun. 18, 2012), 2 pgs.

"The Mobile Secure Desktop Supports BYOD Diversity", Copyright © 2012 VMware, Inc., [Online]. Retrieved from the Internet: <URL: http://www.vmware.com/solutions/desktop/mobile-secure-desktop/overview.html>, (Accessed Jun. 20, 2012), 1 pg.

"Virtual Network Computing", Wikipedia®, [Online]. Retrieved from the Internet: <URL: http://en.wikipedia.org/wiki/Virtual_Network_Computing>, (Accessed Jun. 21, 2012), 6 pgs.

"VMware Horizon Mobile and VMware Mobile Virtualization Platform", Copyright © 2012 VMware, Inc., [Online]. Retrieved from the Internet: <URL: http://www.vmware.com/products/mobile/overview.html>, (Accessed Jun. 20, 2012), 2 pgs.

"VMware Player", Copyright © 2012 VMware, Inc., [Online]. Retrieved from the Internet: <URL: http://vmare.com/products/player/overview.html>, (Accessed Jun. 20, 2012), 2 pgs.

"VMware Workstation:Run Multiple OS Including Linux & Window 7, on Virtual Machines", Copyright © 2012 VMware, Inc., [Online]. Retrieved from the Internet: <URL: http://www.vmware.com/products/workstation/overview.html>, (Accessed Jun. 20, 2012), 2 pgs.

"Windows Thin Pc", © 2012 Microsoft, [Online]. Retrieved from the Internet: <URL: http://www.microsoft.com/en-us/windows/enterprise/products-and-technologies/virtualization/thinpc.aspx>, (Accessed Jun. 21, 2012), 3 pgs.

Adams, Keith, et al., "A Comparison of Software and Hardware Techniques for x86 Virtualization", ASPLOS'06. Copyright (c) 2006 ACM, [Online]. Retrieved from the Internet: <URL: http://www.ittc.ku.edu/~niehaus/classes/750-s09/documents/asplos235_adams-2006.pdf>, (Oct. 21-25, 2006), 12 pgs.

(56) References Cited

OTHER PUBLICATIONS

Athambawa, Aiman, "Desktop Virtualization", © 2012 Social Science Electronic Publishing, Inc., [Online]. Retrieved from the Internet: <URL: http://ssrn.com/abstract=2003376>, (Dec. 12, 2010), 10 pgs.

Bittman, Tom, "Virtualization with VMware or Hyper-V: What You Need to Know", Gartner Webinar, [Online]. Retrieved from the Internet: <http://my.gartner.com/it/content/1103500/1103512/august26_virtualization_tombittman_final.p.df>, (Aug. 26, 2009), 25 pgs.

Chawdhry, Adnan A, "Virtualization: Providing Better Computing to Universities", 2010 ISECON Proceedings. vol. 27 No. 1401, [Online]. Retrieved from the Internet: <URL: http://proc.isecon.org/2010/pdf/1401.pdf>, (2010), 7 pgs.

Dowty, Micah, et al., "GPU Virtualization on VMware's Hosted I/O Architecture", VMware, Inc., [Online]. Retrieved from the Internet: <URL: http://static.usenix.org/events/wiov08/tech/full_papers/dowty/dowty_html/>, (2009), 16 pgs.

Figueiredo, Renato, et al., "Guest Editors' Introduction: Resource Virtualization Renaissance", (vol. 38, No. 5) © 2005 IEEE Published by the IEEE Computer Society, [Online]. Retrieved from the Internet: <URL: http://ngis.computer.org/csdl/mags/co/2005/05/r5028.html>, (May 2005), pp. 28-31.

Lu, Hongjun, et al., "Integrating Database and World Wide Web Technologies", (1998), 29 pgs.

Lunsford, Dale L, "Virtualizaton Technologies in Information Systems Education", Journal of Information Systems Education, vol. 20(3), [Online]. Retrieved from the Internet: <URL: http://ocean.otr.usm.edu/~w300778/is-doctor/pubpdf/jise2009.pdf>, (2009), 10 pgs.

Plessl, Christian, et al., "Virtualization of Hardware—Introduction and Survey", Swiss Federal Institute of Technology (ETH) Zurich, Switzerland, [Online]. Retrieved from the Internet: <URL: http://homepages.uni-paderborn.de/plessl/publications/pless104_ersa.pdf>, (2004), 7 pgs.

Pratt, Ian, "Xen and the Art of Virtualization", Citrix Systems, [Online]. Retrieved from the Internet: <URL: http://xpgc.vicp.net/course/svt/lectures/intel/lan%20Pratt%20Keynote%20-For%202009%20Virtualization%20Faculty%20Training.pdf>, (2004), 41 pgs.

\* cited by examiner

FIG. 12

MOBILE DEVICE INTERFACE GENERATOR

BACKGROUND

Server based applications may be designed to communicate with many different devices, such as mobile devices and intelligent workstations, such as laptop and desktop personal computers. In many cases, separate user interfaces may be generated by the server for different types of devices, or, an intermediate server may be used to generate a user interface for mobile devices, as the displays of mobile devices are different from the displays of most workstations, and the abilities of a user to interact with mobile devices may also be quite different than the interactions with workstations.

SUMMARY

A mobile device and method includes receiving communications from an application server at a touchscreen based mobile device, wherein the communications are tailored for providing a user interface for a workstation computer system, translating the received communications at the mobile device into a mobile device user interface tailored for the mobile device touchscreen, receiving user interactions via the mobile device touchscreen, translating the received user interactions into corresponding workstation based user interactions, and transmitting the translated user interaction to the application server such that the application server interacts with the mobile device in the same manner as with workstations.

A mobile device includes a processor, a touchscreen interface coupled to the processor, a transceiver coupled to the processor to communicate with an application server via a wireless access point, and a memory coupled to the processor, the memory having instructions stored thereon. The instructions are adapted to cause the processor to receive communications from the application server, wherein the communications are tailored for providing a user interface for a workstation computer system, translate the received communications into a mobile device user interface tailored for the mobile device touchscreen, receive user interactions via the mobile device touchscreen, translate the received user interactions into corresponding workstation based user interactions, and transmit the translated user interaction to the application server such that the application server interacts with the mobile device in the same manner as with workstations.

BRIEF DESCRIPTION OF THE DRAWINGS

FIG. 12 is an example screen shot of an interface generated by a mobile device for interfacing with a server based application showing an interface for discovering available business warehouse queries according to an example embodiment.

DETAILED DESCRIPTION

Figure 1:
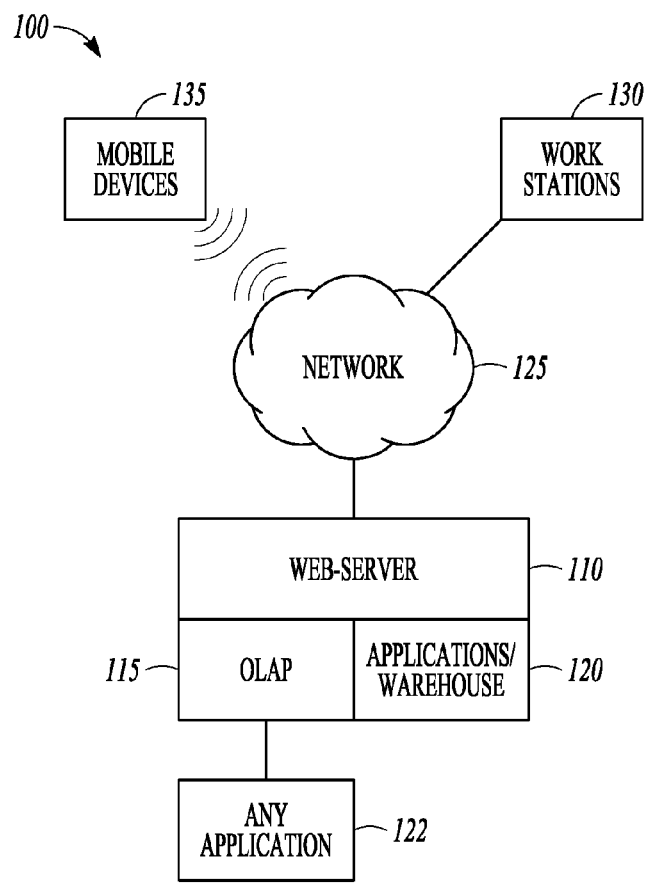
FIG. 1 is a block diagram of a system interfacing with workstations and mobile devices according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A mobile device and method includes receiving communications from an application server at a touchscreen based mobile device, wherein the communications are tailored for providing a user interface for a workstation computer system, translating the received communications at the mobile device into a mobile device user interface tailored for the mobile device touchscreen, receiving user interactions via the mobile device touchscreen, translating the received user interactions into corresponding workstation based user interactions, and transmitting the translated user interaction to the application server such that the application server interacts with the mobile device in the same manner as with workstations.

A mobile device includes a processor, a touchscreen interface coupled to the processor, a transceiver coupled to the processor to communicate with an application server via a wireless access point, and a memory coupled to the processor, the memory having instructions stored thereon. The instructions are adapted to cause the processor to receive communications from the application server, wherein the communications are tailored for providing a user interface for a workstation computer system, translate the received communications into a mobile device user interface tailored for the mobile device touchscreen, receive user interactions via the mobile device touchscreen, translate the received user interactions into corresponding workstation based user interactions, and transmit the translated user interaction to the application server such that the application server interacts with the mobile device in the same manner as with workstations.

FIG. 1 is a block diagram of a system 100. System 100 includes a web server portion 110, that may include a wireless access point and hardwired connections, represented at 112. In one embodiment, an on line analytical processing (OLAP) unit 115 is coupled to the web server portion 110. Further applications 120, may include a business information warehouse database to provide business information for querying and many other different types of applications as shown at 122, such as SAP HANA, SAP Business Suite, and others. The web server 110 portion of the system 100 is coupled via a network 125 to interface with both workstations 130 and mobile devices 135.

Workstations 130 generally include personal computers and laptop devices with keyboards and touch pads or other user interface devices, such as a physical keyboard, mouse, or trackball. Interfaces generated by the web server are generally tailored to such workstations 130, and may include pull-down menu based interactions with users.

Conversely, mobile devices 135 generally include touchscreens, which create a different paradigm for user interactions with applications. In many prior systems, a separate server has been utilized to interface with mobile devices to provide a different style of interface that is optimized for the mobile devices. In further prior systems, the applications themselves may be programmed specifically to interact differently with workstations and mobile devices. In further prior systems, personal computers were used to emulate dumb terminals to communicate with mainframe computers. However, the personal computers utilized the same types of display and keyboards as the dumb terminals, and user interactions with both devices were very similar.

In one example embodiment, the web server 110 and applications 120 are not modified, but instead provide a single interface for interacting with both mobile devices 135 and workstations 130. In general, the interface is based on the workstation paradigm, with interfaces using more pull-down menus, and generally more text based type of interactions to utilize the functions provided by the applications 120 and OLAP 115.

Figure 2:
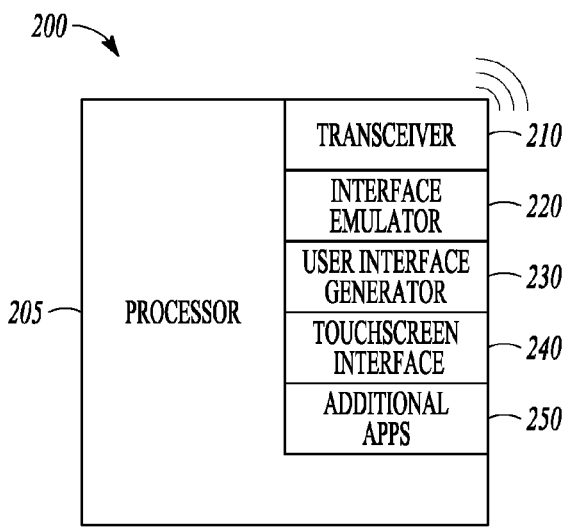
FIG. 2 is a block diagram of a mobile device having an interface emulating a workstation interface according to an example embodiment.

FIG. 2 is a block diagram of a mobile device 200 having an interface emulating a workstation interface according to an example embodiment. A processor 205 performs the emulation, using multiple programs stored on a processor readable storage device. A transceiver 210 is used to provide mobile device communications and is coupled to the processor. The storage device, also referred to as a memory device includes an application or app consisting of code or modules such as interface emulator 220, user interface generator 230, and touchscreen interface 240. The code may be integrated into a single program in different embodiments, or otherwise logically arranged. In addition, the storage device may contain several additional applications 250 and code to implement further functions. The memory device is thus comprised of blocks 220, 230, 240, and 250 in some embodiments.

In various embodiments, the mobile device 200 may be a smart phone, a pad type of device, or other type of device having a touchscreen, processor, memory, and wireless capabilities. Current examples include Apple IPad®, devices implementing Mobile Windows®, and Android based devices. Applications designed for such devices have user interfaces that are more icon based and more suited for touch and gesture based user interactions than the interfaces for workstations. The term touch, is meant to signify one or more of a tap, touch, gesture, or other interaction with a touchscreen using one or more fingers or pointing device.

Figure 3:
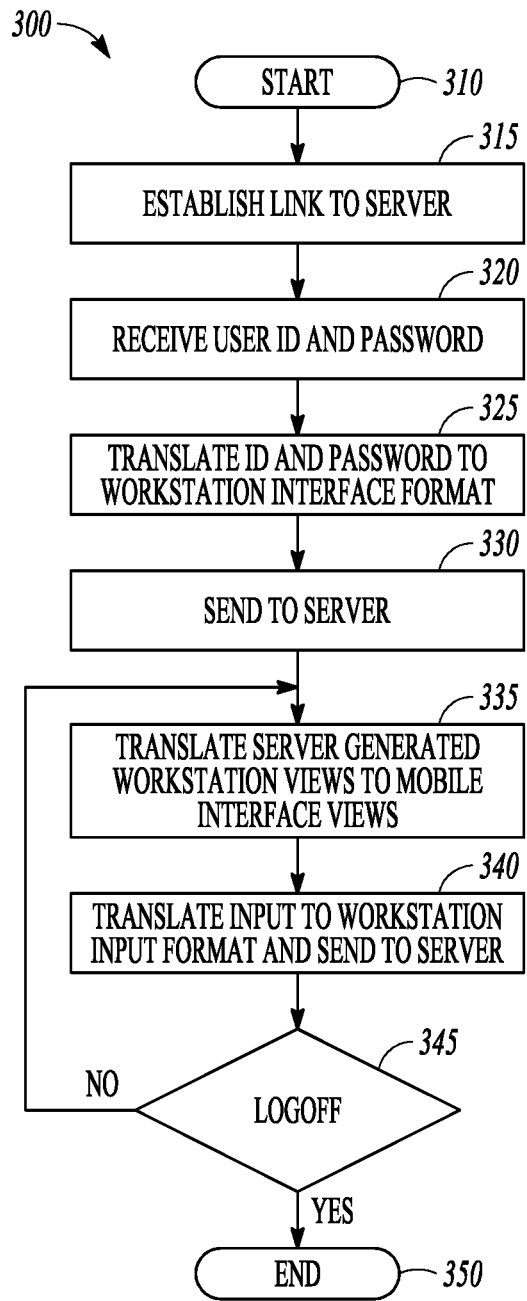
FIG. 3 is a block flow diagram illustrating a method executed by a mobile device communicating with a server according to an example embodiment.

FIG. 3 is a block flow diagram illustrating a method 300 executed by a mobile device communicating with a server according to an example embodiment. The method 300 starts at 310, with the mobile device establishing a link to an access point of a server at 315. The server 315 provides a sign on screen to obtain credentials at 320. The sign on screen in one embodiment is simply displayed as provided by the server. In further embodiments, the mobile device may optionally modify the display to make it more amenable to display and user input on a touchscreen of the mobile device.

At 325, the ID and password is translated to be identical to that which would be provided if the user were signing in via a workstation. There may be no need for such a translation in some embodiments, as the user interface may be pretty much the same for both a workstation and a mobile device. At 330, the sign in credentials are sent to the server.

At 325, once the server verifies the credentials, a connection is established between the mobile device and the server. The server provides information to be displayed to the mobile device via the connection. The information may be a first screen that the user normally sees when logging into the application running on the server in some embodiments. The mobile device receives the information and translates the workstation based views to a user interface view that is more suitable or tailored to user interaction with the mobile device.

The user may then interact with the mobile device user interface. These interactions are then translated at 340 to a workstation input format, and are sent to the server. At 345, if the user logs off, process 300 ends at 350. If not, the emulation of the workstation by the mobile device continues at 335 and 340 until the connection is ended.

Figure 4:
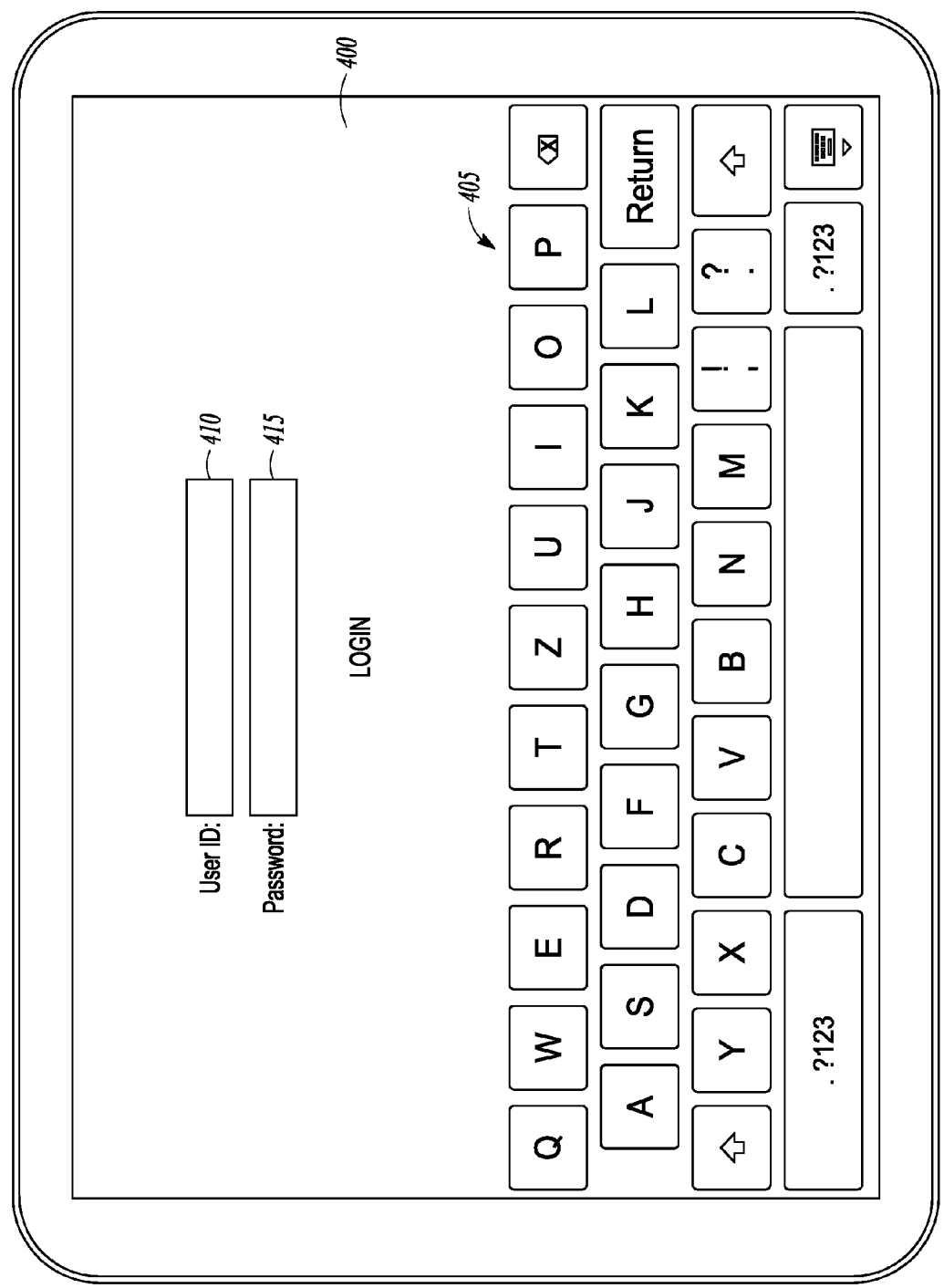
FIG. 4 is an example log in screen to connect a mobile device emulating a workstation to a server according to an example embodiment.

FIG. 4 is an example log in touchscreen 400 to connect a mobile device emulating a workstation to a server according to an example embodiment. A virtual keyboard 405 is displayed on the touchscreen 400, allowing user input of a user id 410 and a password 415. The user id and password comprise credentials to allow access to the wireless access point for security purposes to prevent unauthorized users from signing on to a server and an application. More levels of security may be provided in further embodiments, including further sign on's to one or more applications running on a server. In still further embodiments, a single sign-on with a certificate may be used, obviating the use of a log in screen.

Figure 5:
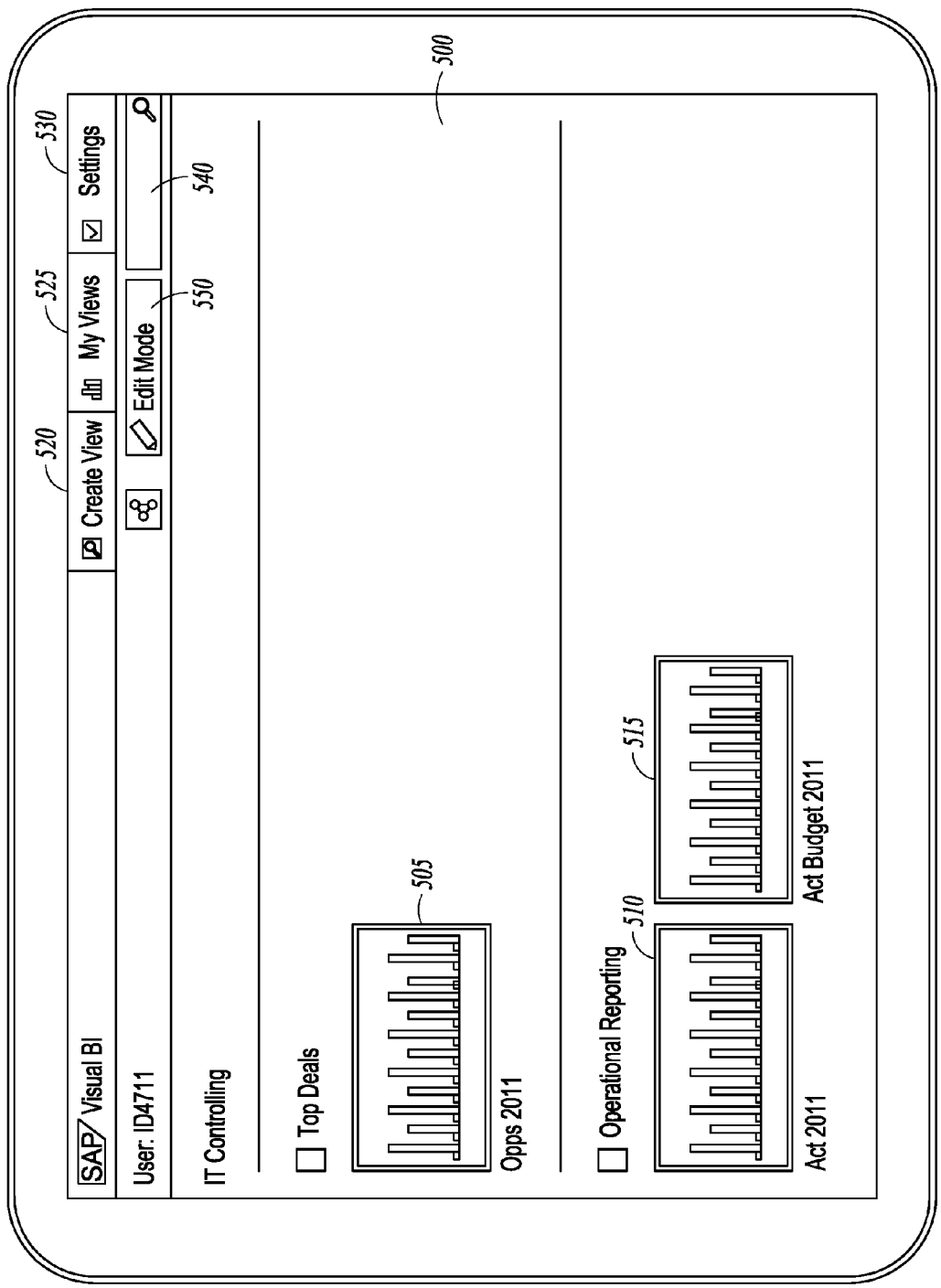
FIG. 5 is an example screen shot of an interface generated by a mobile device for interfacing with a server based application showing stored views for browsing according to an example embodiment.

FIG. 5 is an example screen shot of an interface 500 generated by a mobile device for interfacing with a server based application showing stored views 505, 510, and 515 for browsing according to an example embodiment. The stored views are presented as icons in one embodiment, or may be thumbnails images of the actual underlying data in further embodiments. Tapping on the thumbnail results in a larger display of the actual data in the view. In one embodiment, the views are represented in different categories, such as top deals and operational reporting to provide a mobile device friendly way of showing the stored views and allowing the user to easily select a view. The views may be scrolled using common gestures to show further views that do not fit on the screen.

In some embodiments, interface 500 also includes several options, such as the ability to create a view at 520, show all a user's views at 525, modifying settings at 530, search for different views or other information provided by the application at 540, and to enter an edit mode at 550 to modify views. Views may also be shared with other users in further embodiments.

Figure 6:
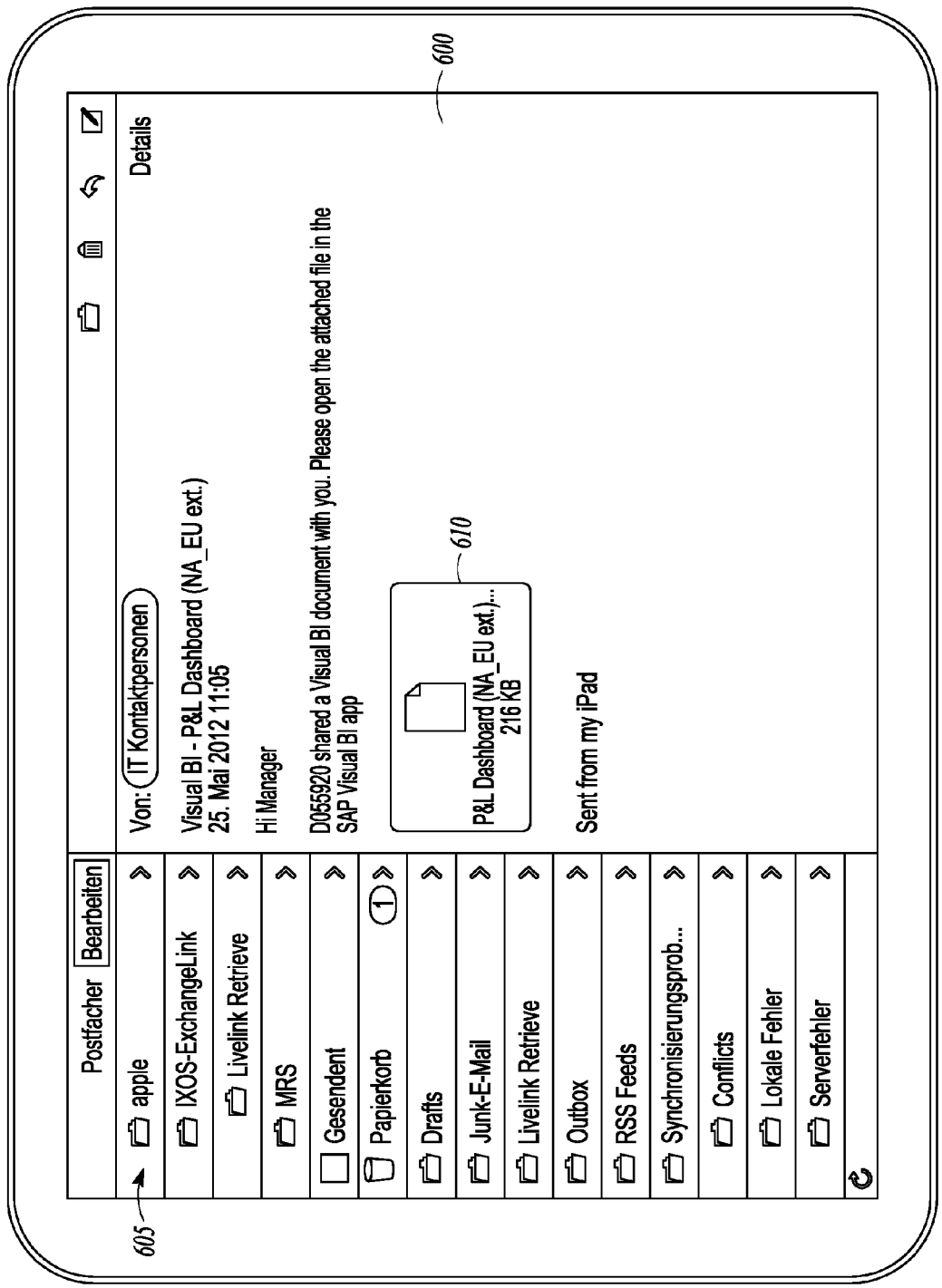
FIG. 6 is an example screen shot of an interface generated by a mobile device for interfacing with a server based application showing a user interface for importing new views according to an example embodiment.

FIG. 6 is an example screen shot of an interface 600 generated by a mobile device for interfacing with a server based application showing a user interface for importing new views according to an example embodiment. In one embodiment, a directory of information available to the user is provided in the left portion 605 of the interface 600. The right portion of the interface 600 shows a communication from an employee that includes a new view 610 related to a profit and loss dashboard. The user can simply tap or click on the view 610 to import the view. In some embodiments, a new file extension, "vbi", is created and the file is automatically opened, such as when using an IPad® device.

Figure 7:
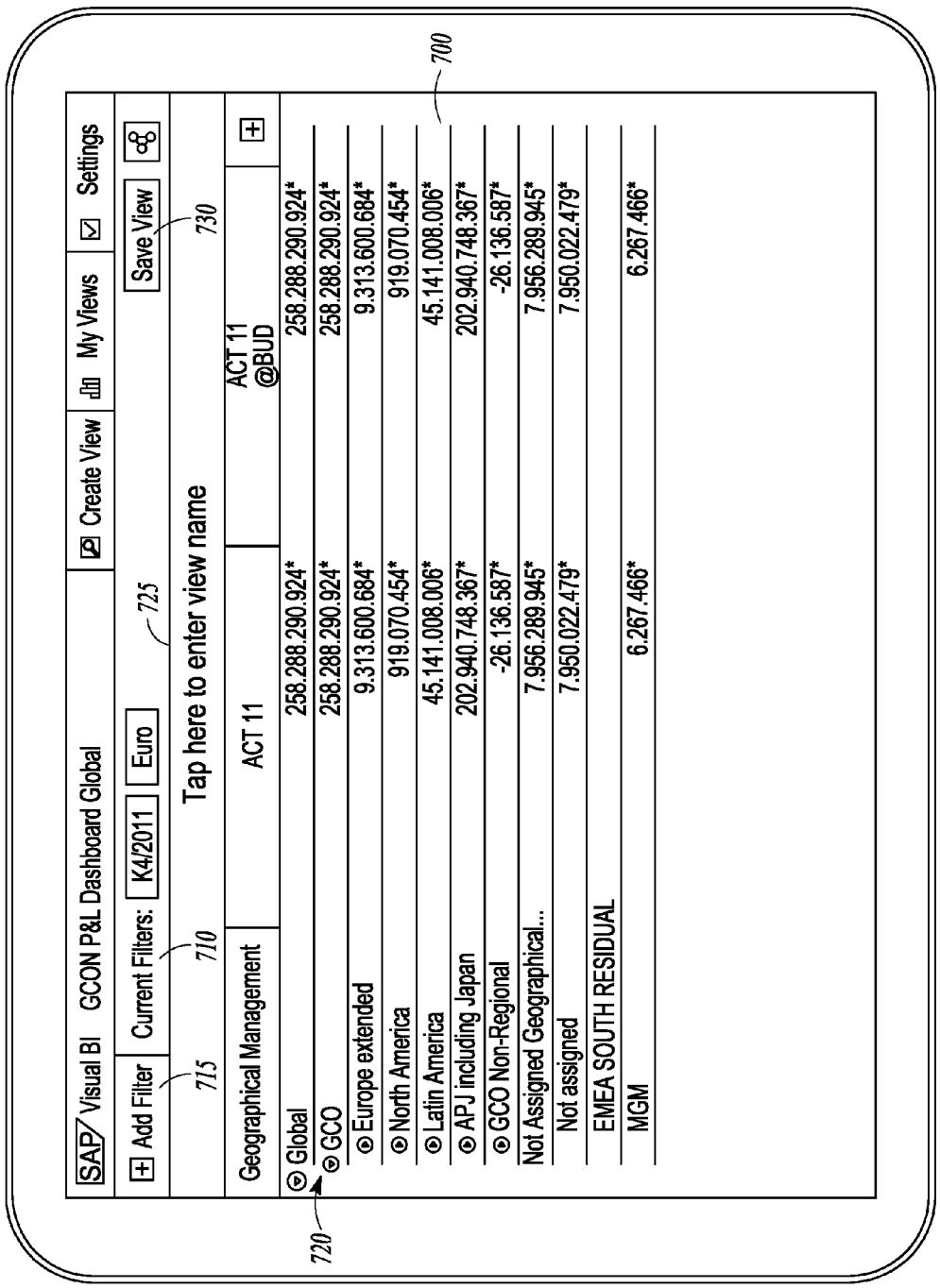
FIG. 7 is an example screen shot of an interface generated by a mobile device for interfacing with a server based application showing an interface for executing views with real-time data according to an example embodiment.

FIG. 7 is an example screen shot of an interface 700 generated by a mobile device for interfacing with a server based application showing an interface for executing views with real-time data according to an example embodiment. Interface 700 provides an interface into views on global profit and loss data. Many different views may be created based on availability of data from backend systems such as ERP (Enterprise Resource Planning), CRM (Customer Relationship Management), and others. Current filters have been selected and are identified at 710. A button is provided to add filters at 715, and hierarchically arranged geographical areas have been selected for the view as indicated generally at 720. An area 725 is provided, which when selected, facilitates entry of a name of a view being created with display of real-time data. Finally, the view may be saved as indicated at 730.

Figure 8:
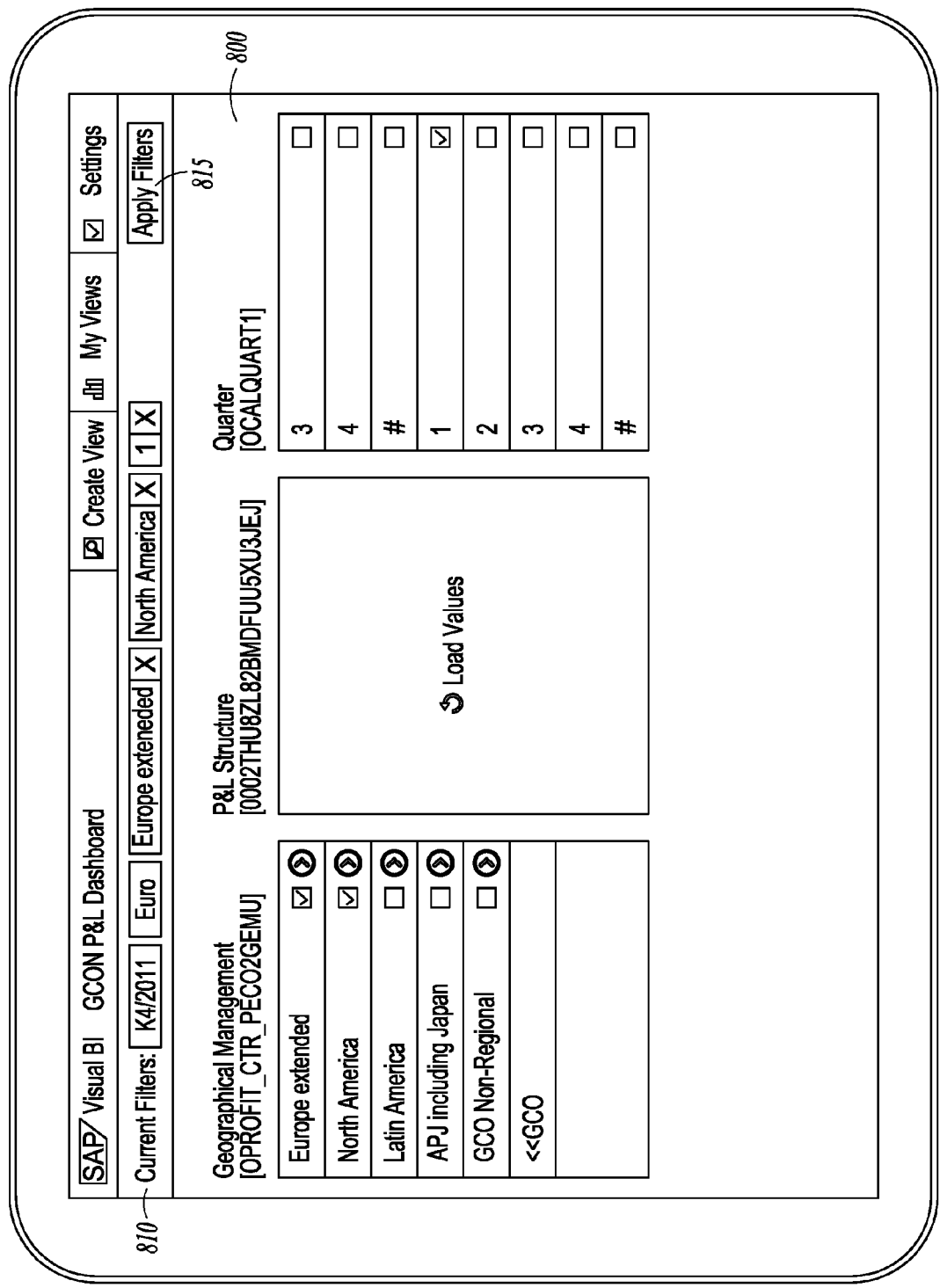
FIG. 8 is an example screen shot of an interface generated by a mobile device for interfacing with a server based application showing an interface for adding or removing filters according to an example embodiment.

FIG. 8 is an example screen shot of a interface 800 generated by a mobile device for interfacing with a server based application showing an interface for adding or removing filters according to an example embodiment. Several filters are shown at 810. An "x" is provided to remove a filter. A further button 815 is provided to apply the filters to the current view.

Figure 9:
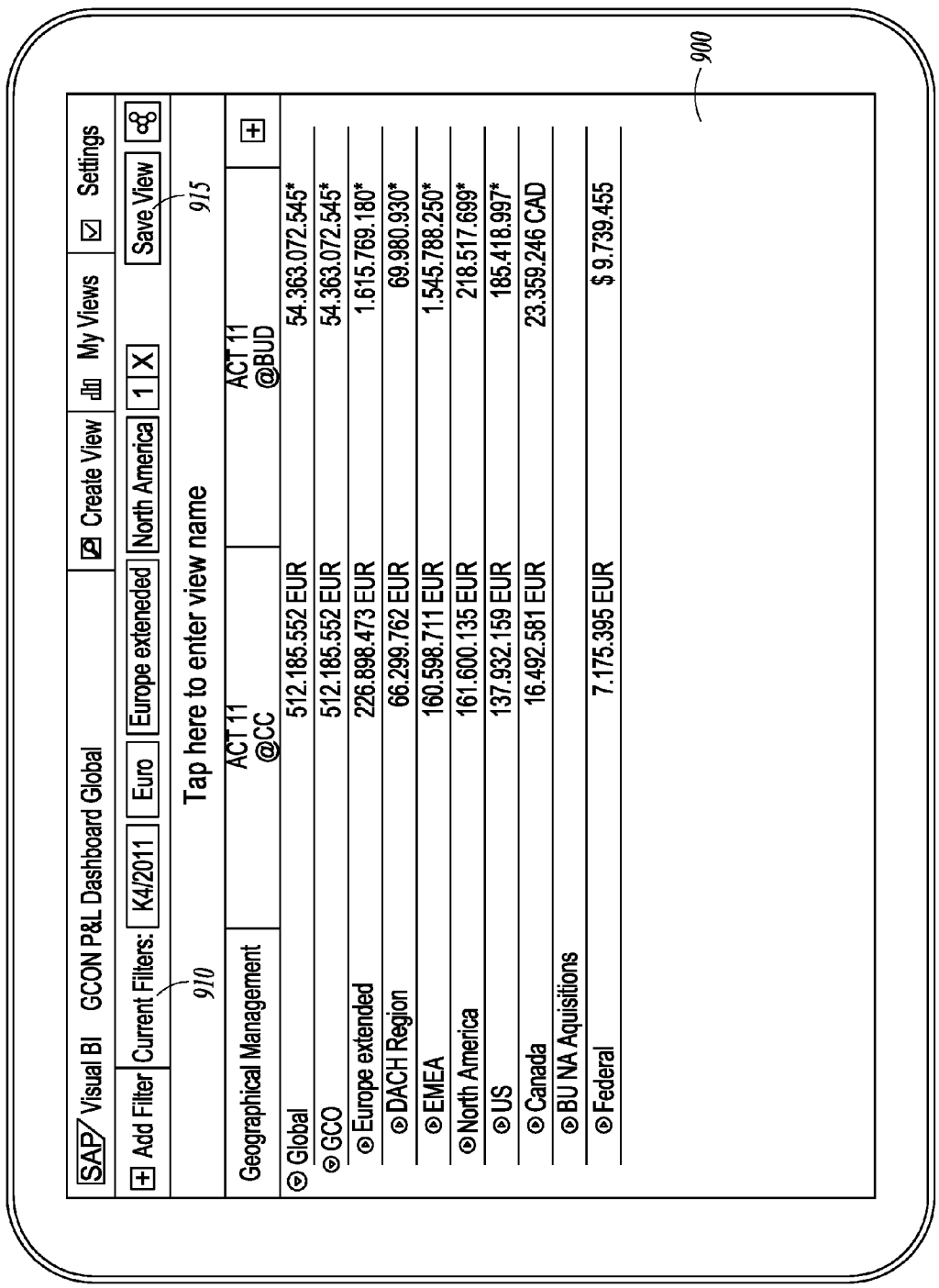
FIG. 9 is an example screen shot of an interface generated by a mobile device for interfacing with a server based application showing an interface for displaying a filtered view according to an example embodiment.

FIG. 9 is an example screen shot of an interface 900 generated by a mobile device for interfacing with a server based application showing an interface for displaying a filtered view according to an example embodiment. The view contains only data which matches the selected filters 910. The view may be saved at 915.

Figure 10:
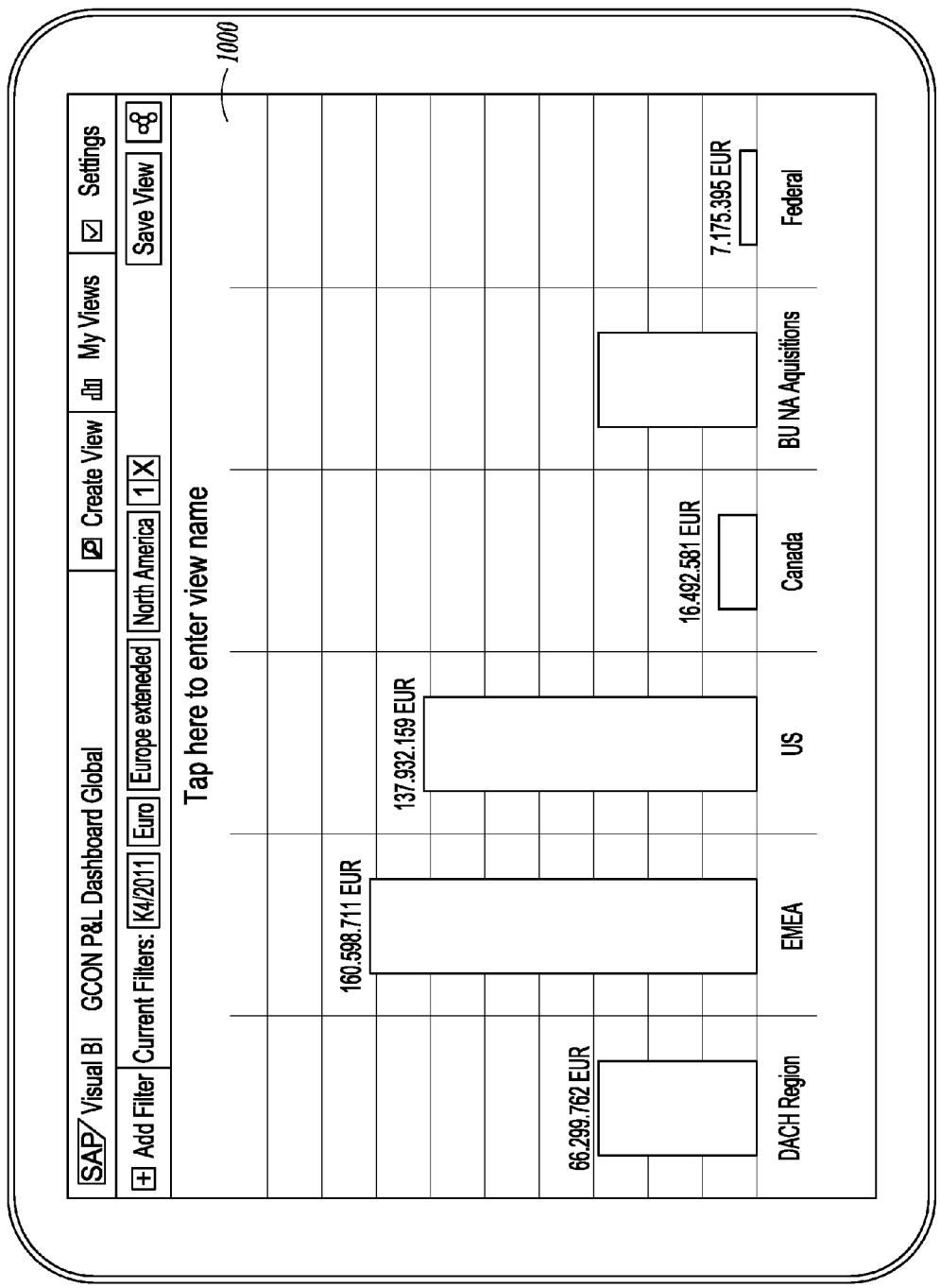
FIG. 10 is an example screen shot of an interface generated by a mobile device for interfacing with a server based application showing an interface for displaying a view as a graph according to an example embodiment.

FIG. 10 is an example screen shot of an interface 1000 generated by a mobile device for interfacing with a server based application showing an interface for displaying a view as a graph according to an example embodiment. The filters are shown, and each selected area is represented by a bar. A user may also scroll down, using finger gestures or other control buttons, either screen based or device based mechanical buttons to display a graph of a table view.

Figure 11:
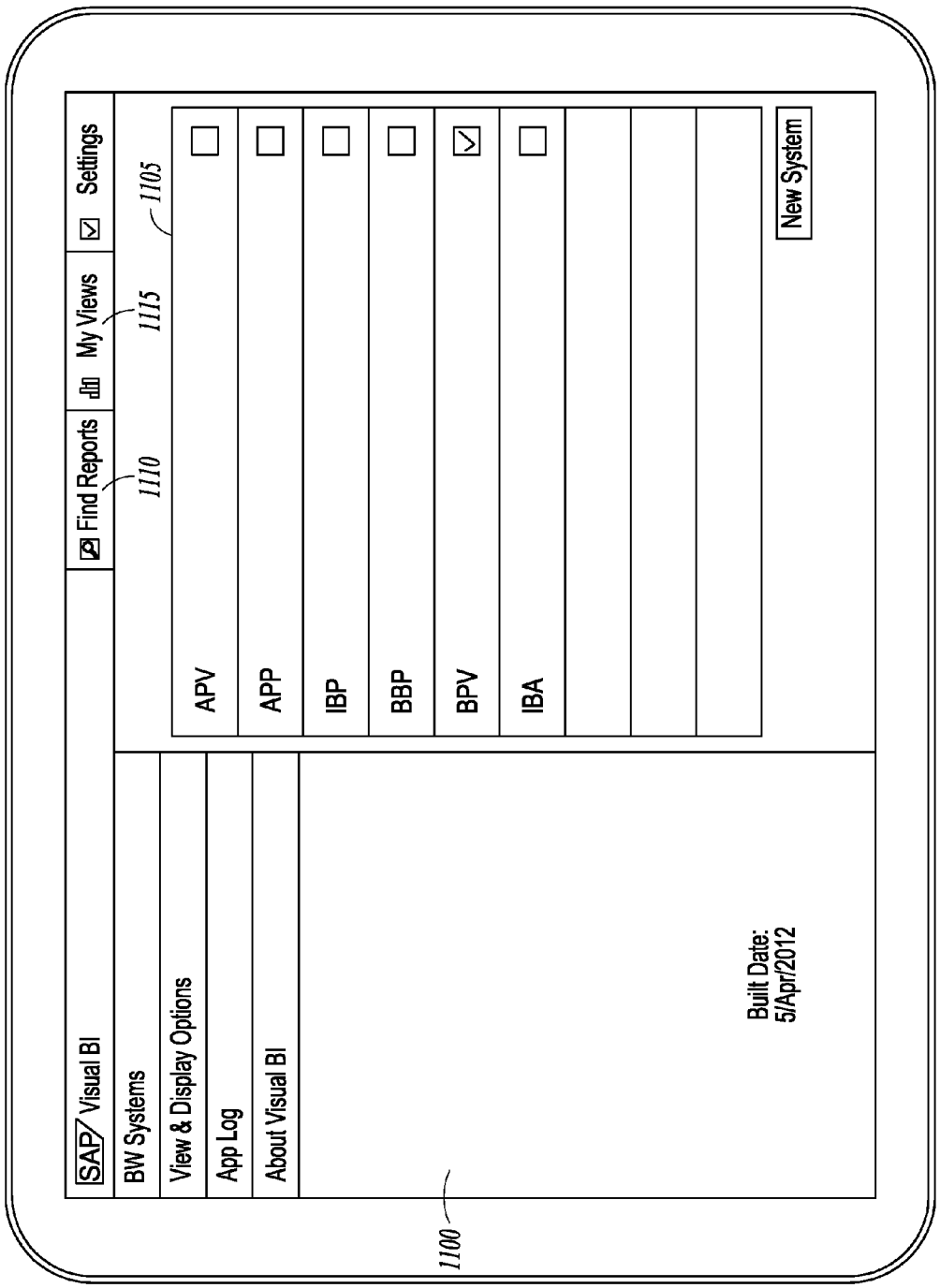
FIG. 11 is an example screen shot of an interface generated by a mobile device for interfacing with a server based application showing an interface for connecting to an application running on a server according to an example embodiment.

FIG. 11 is an example screen shot of an interface 1100 generated by a mobile device for interfacing with a sever based application showing an interface for connecting to for example a business warehouse system running on a server according to an example embodiment or other applications as indicated in FIG. 1. In interface 1100, several applications provided via the wireless access point are illustrated at 1105, with a business warehouse application shown as selected. Selections available include a find reports option 1110 and my views option 1115. In some embodiments, each application may include access to the translation and emulation capabilities to optimize interactions with the applications via a mobile device user interface.

Figure 12:
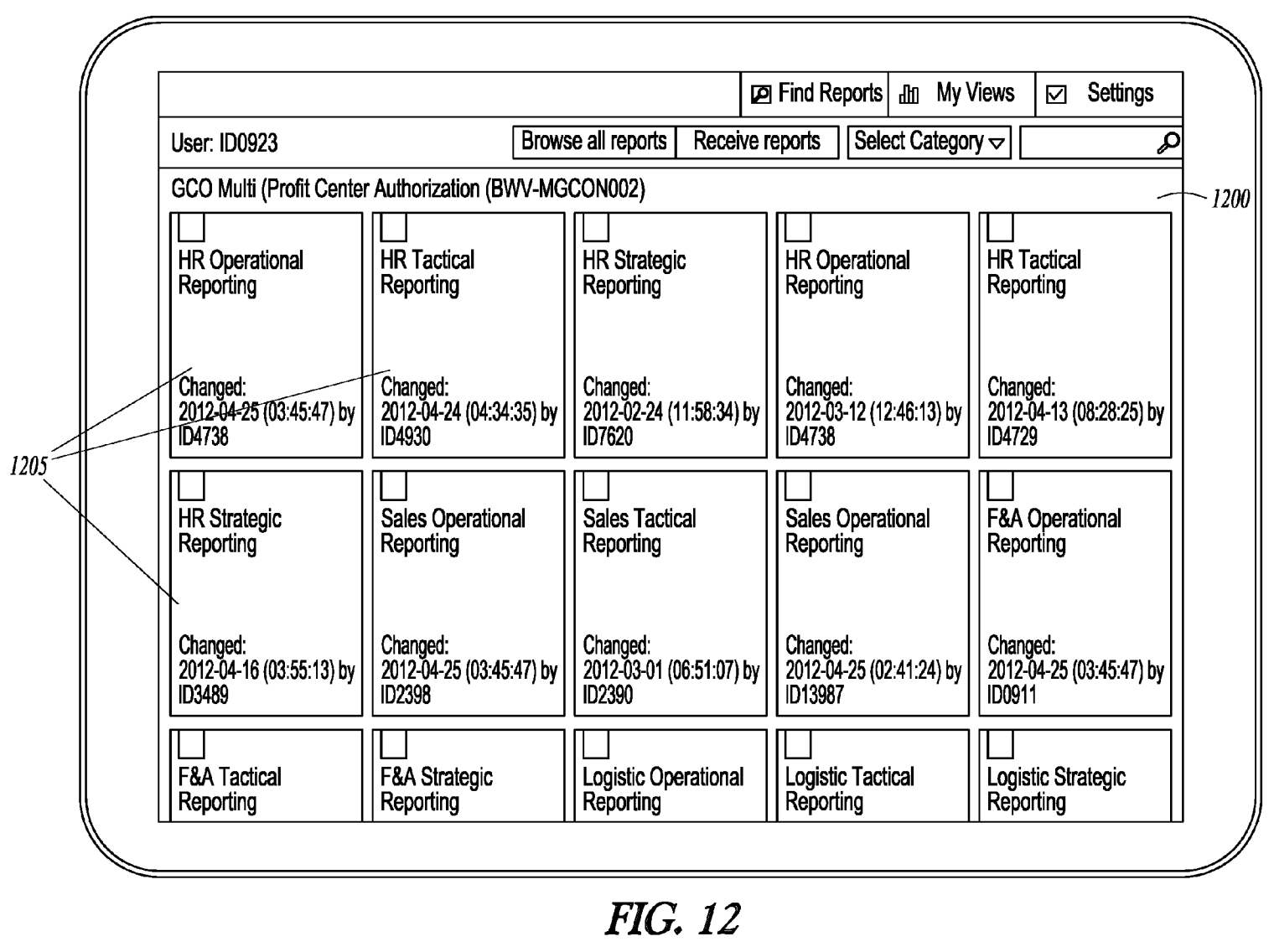

FIG. 12 is an example screen shot of an interface 1200 generated by a mobile device for interfacing with a server based application showing an interface for discovering available business warehouse queries 1205 according to an example embodiment. In one embodiment, queries may be referred to as reports. Several are shown, three of which are indicated by reference number 1205. The queries 1205 are represented with icons that appear as pages of information, such as metadata information that is viewable at a glance, including a name of the report and when the report was last changed. By scrolling using touchscreen gestures, more reports are accessible than can be seen on one screen. In further embodiments, the displayed queries may be filtered, and metadata searched to obtain a desired or required query. Categories of queries may also be selected.

Figure 13:
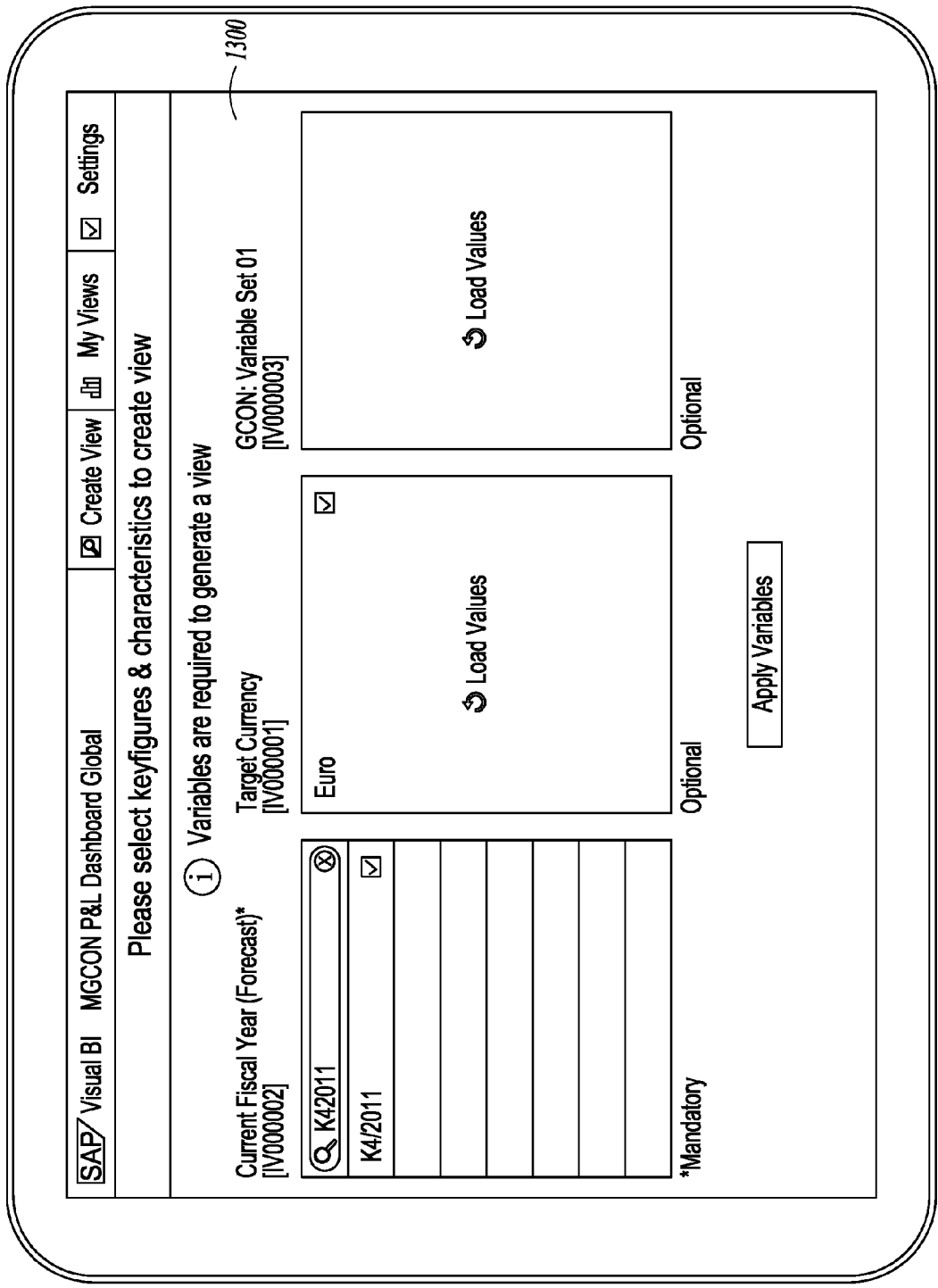
FIG. 13 is an example screen shot of an interface generated by a mobile device for interfacing with a server based application showing an interface for selecting variables provided by a query according to an example embodiment.

FIG. 13 is an example screen shot of an interface 1300 generated by a mobile device for interfacing with a server based application showing an interface for selecting variables provided by a query according to an example embodiment. Variable selection is supported via interface 1300. In this view of interface 1300, predefined variables are already selected. The interface allows differentiation of mandatory and optional variables, as well as searching for required variables.

Figure 14:
FIG. 14 is an example screen shot of an interface generated by a mobile device for interfacing with a server based application showing an interface for selecting characteristics and key figures provided by a query according to an example embodiment.

FIG. 14 is an example screen shot of an interface 1400 generated by a mobile device for interfacing with a server based application showing an interface for selecting characteristics and key figures provided by a query according to an example embodiment. Interface 1400 provides for selection of required key figures and characteristics, with hierarchies indicated.

Figure 15:
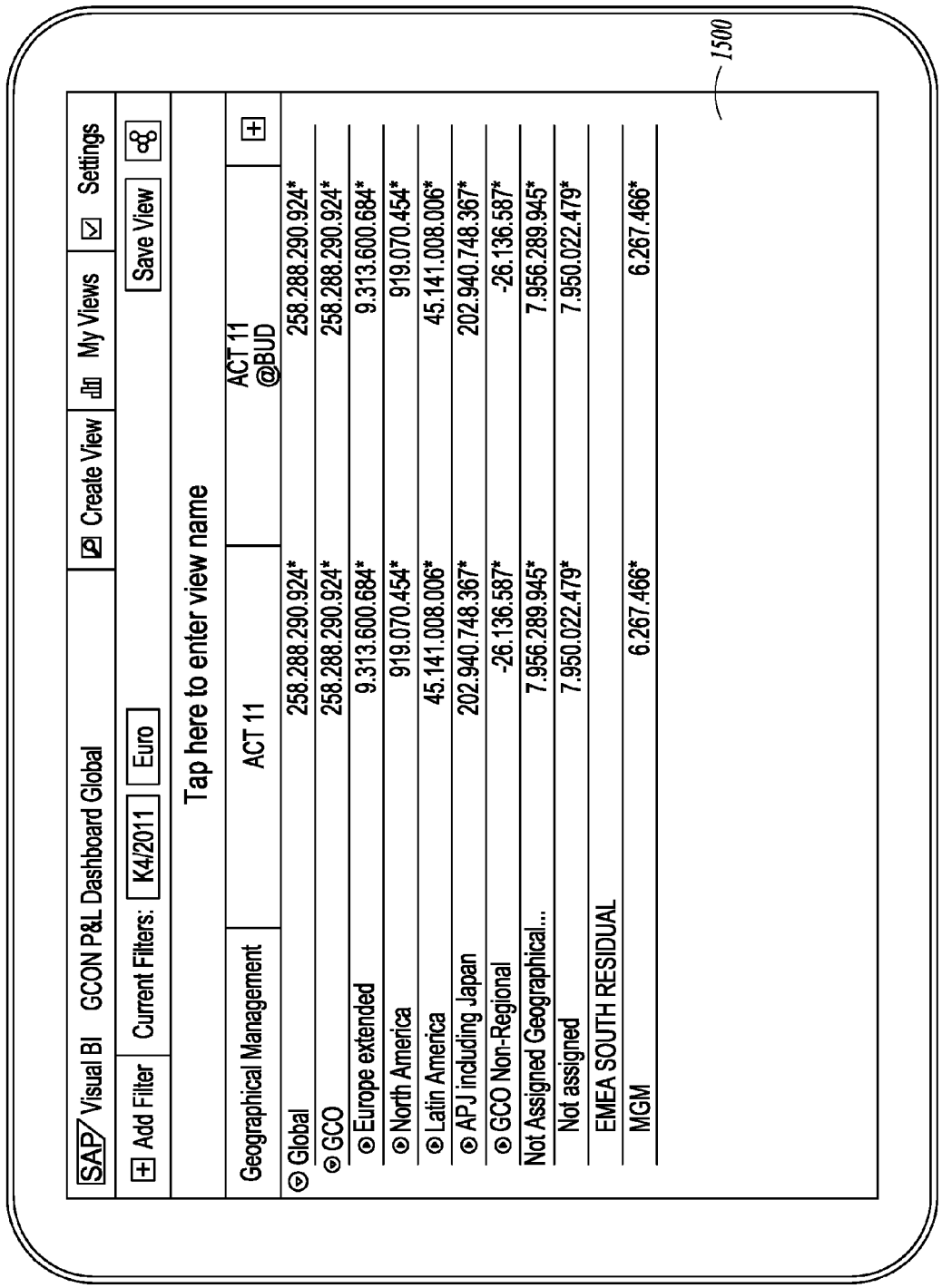
FIG. 15 is an example screen shot of an interface generated by a mobile device for interfacing with a server based application showing an interface for a tabular view according to an example embodiment.

FIG. 15 is an example screen shot of an interface 1500 generated by a mobile device for interfacing with a server based application showing an interface for a tabular view according to an example embodiment. Interface 1500 facilitates preparing a view for requirements of a target group. The column width and drill status are provided in a manner to allow interaction via a touchscreen interface.

Figure 16:
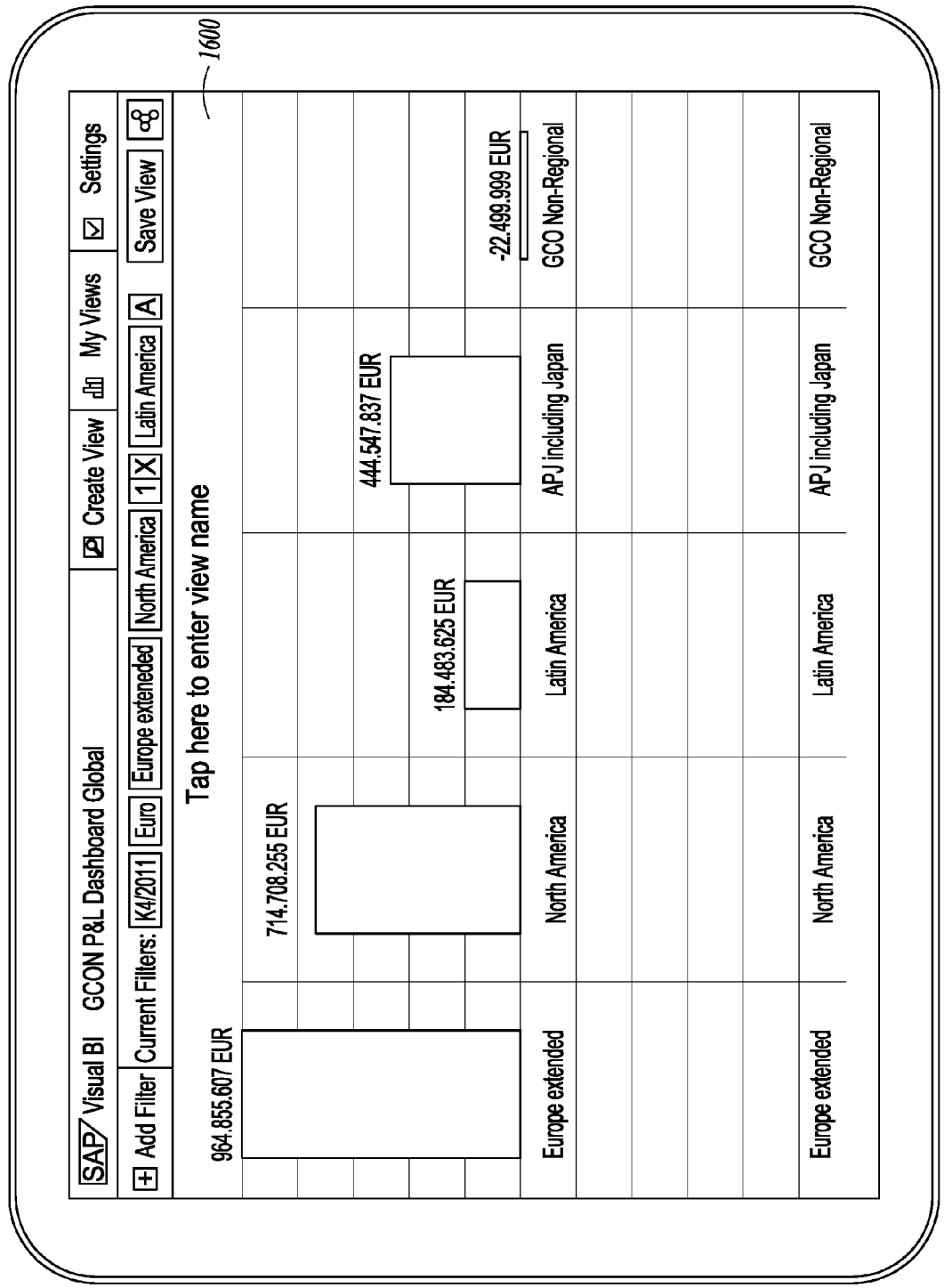
FIG. 16 is an example screen shot of an interface generated by a mobile device for interfacing with a server based application showing an interface for a graph view from a tabular view according to an example embodiment.

FIG. 16 is an example screen shot of an interface 1600 generated by a mobile device for interfacing with a server based application showing an interface for a graph view from a tabular view according to an example embodiment. The interface 1600 provides a graph that requires no action, and is created on the fly depending on the tabular view from which it originates.

Figure 17:
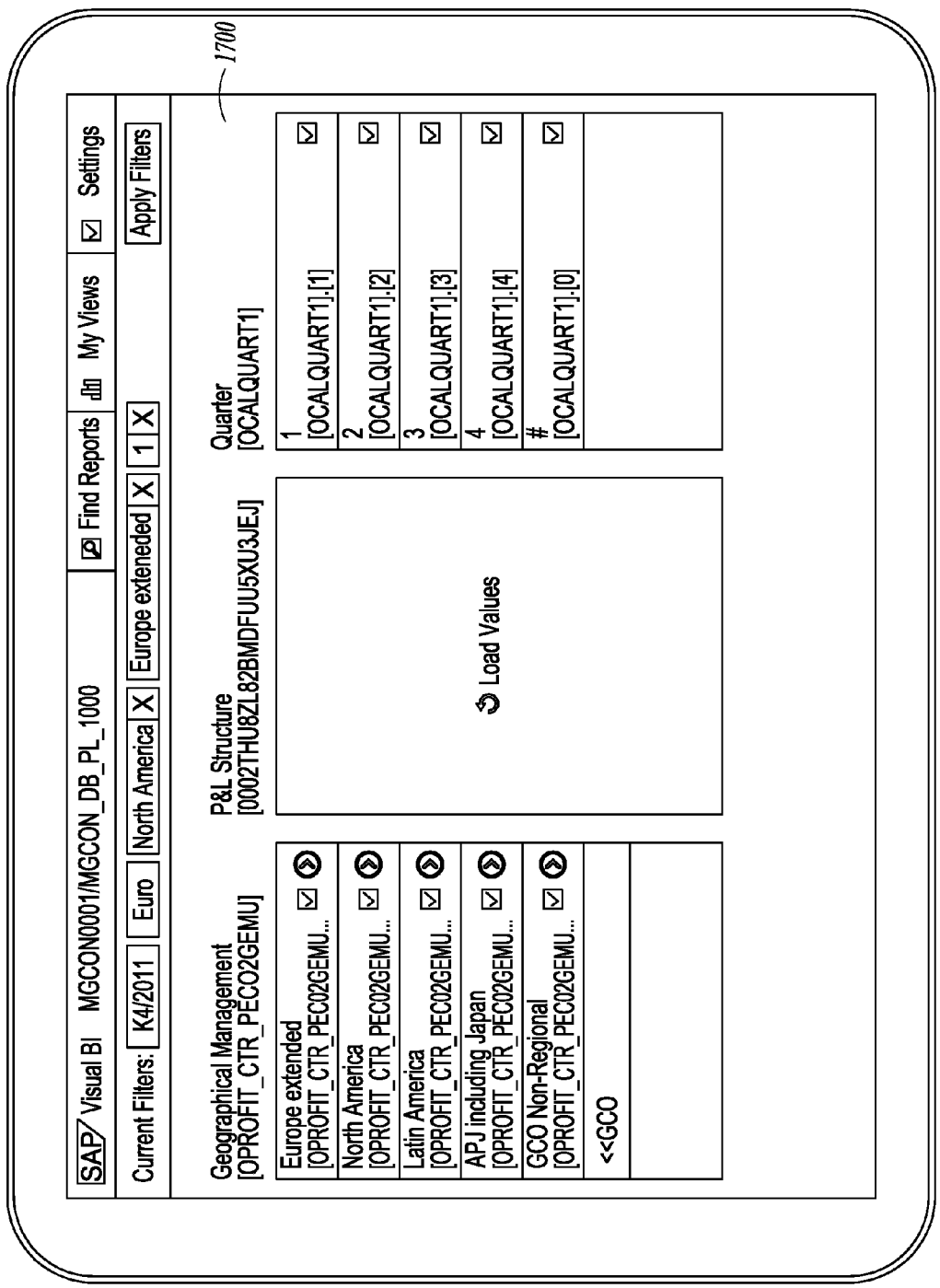
FIG. 17 is an example screen shot of an interface generated by a mobile device for interfacing with a server based application showing an interface for using filters to prepare a view for a target group according to an example embodiment.

FIG. 17 is an example screen shot of an interface 1700 generated by a mobile device for interfacing with a server based application showing an interface for using filters to prepare a view for a target group according to an example embodiment. Interface 1700 facilitates setting of required filters to prepare views for requirements of a target group.

Figure 18:
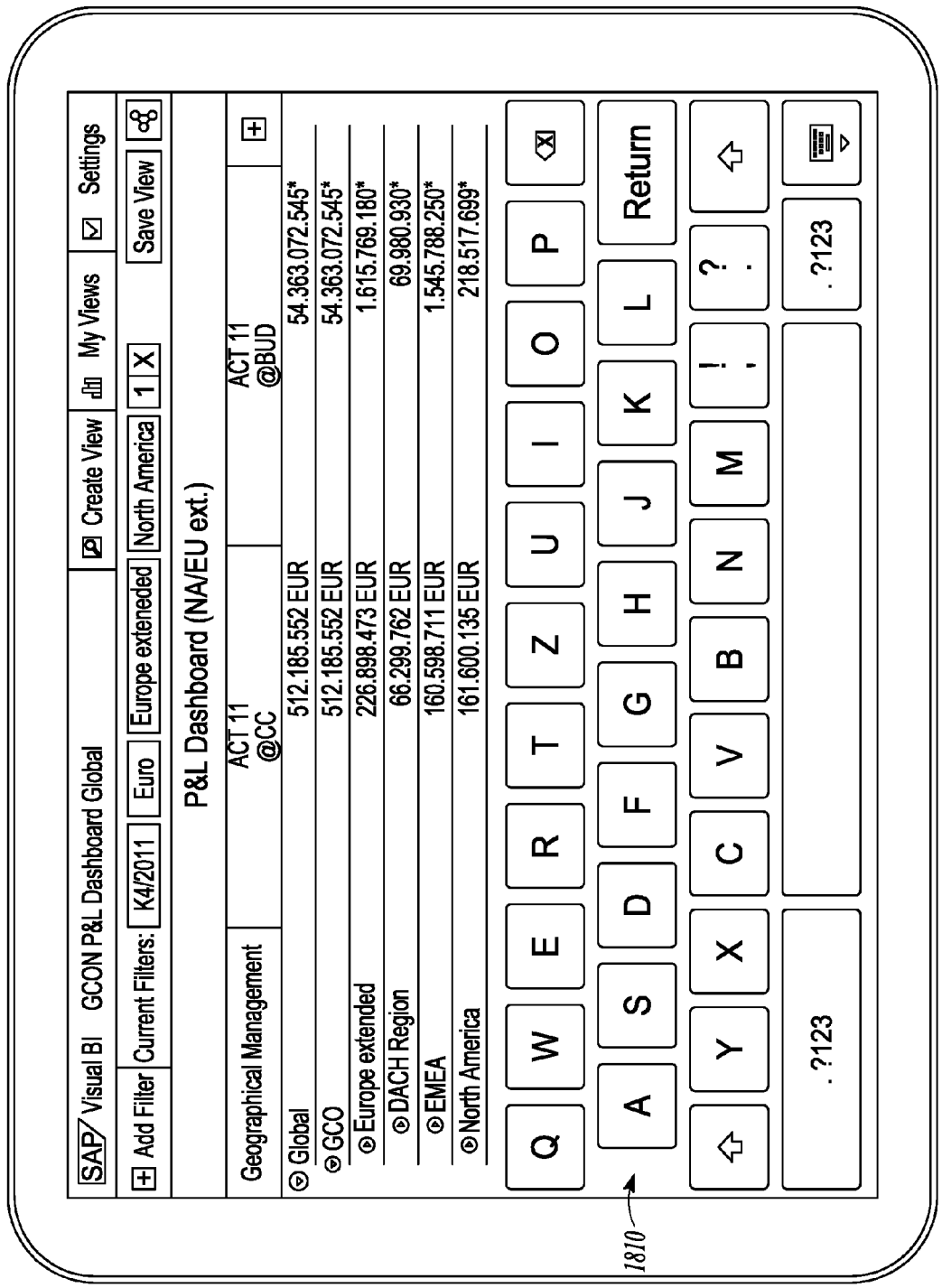
FIG. 18 is an example screen shot of an interface generated by a mobile device for interfacing with a server based application showing an interface for describing and storing parameters for a view according to an example embodiment.

FIG. 18 is an example screen shot of an interface 1800 generated by a mobile device for interfacing with a server based application showing an interface for describing and storing parameters for a view according to an example embodiment. Interface 1800 also provides support for preparing views to meet requirements of a target group. It facilitates describing a created view, does not show actual data, but does show stored parameters used to create the view. A query based keyboard 1810 is also provided on the touchscreen.

Figure 19:
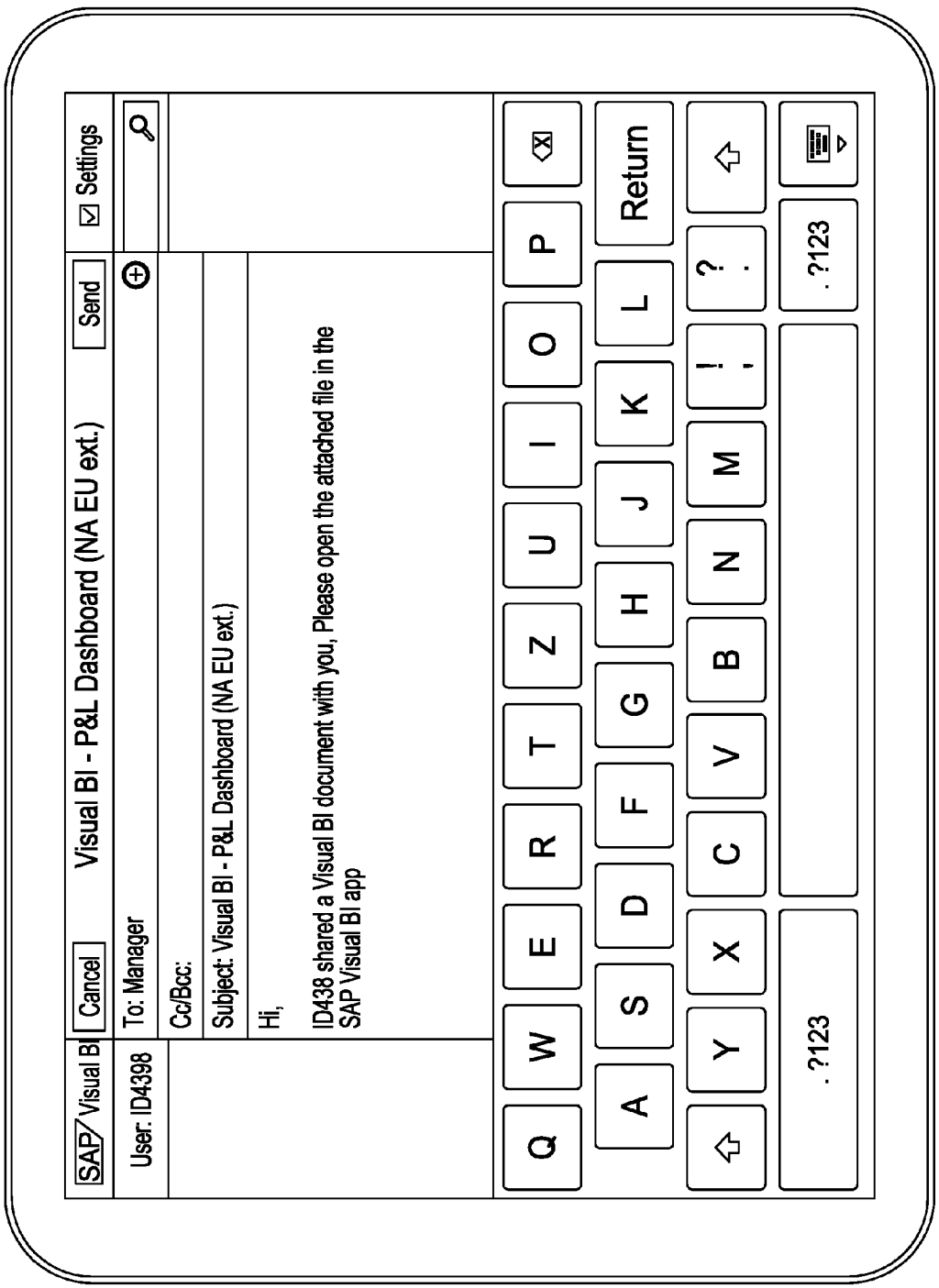
FIG. 19 is an example screen shot of an interface generated by a mobile device for interfacing with a server based application showing an interface for sharing a view with a target group according to an example embodiment.

FIG. 19 is an example screen shot of an interface 1900 generated by a mobile device for interfacing with a server based application showing an interface for sharing a view with a target group according to an example embodiment. A dialog 1910 is provided to facilitate sharing a prepared view with a target group, storing the view on a portal page, and backing up views on computer disk.

Figure 20:
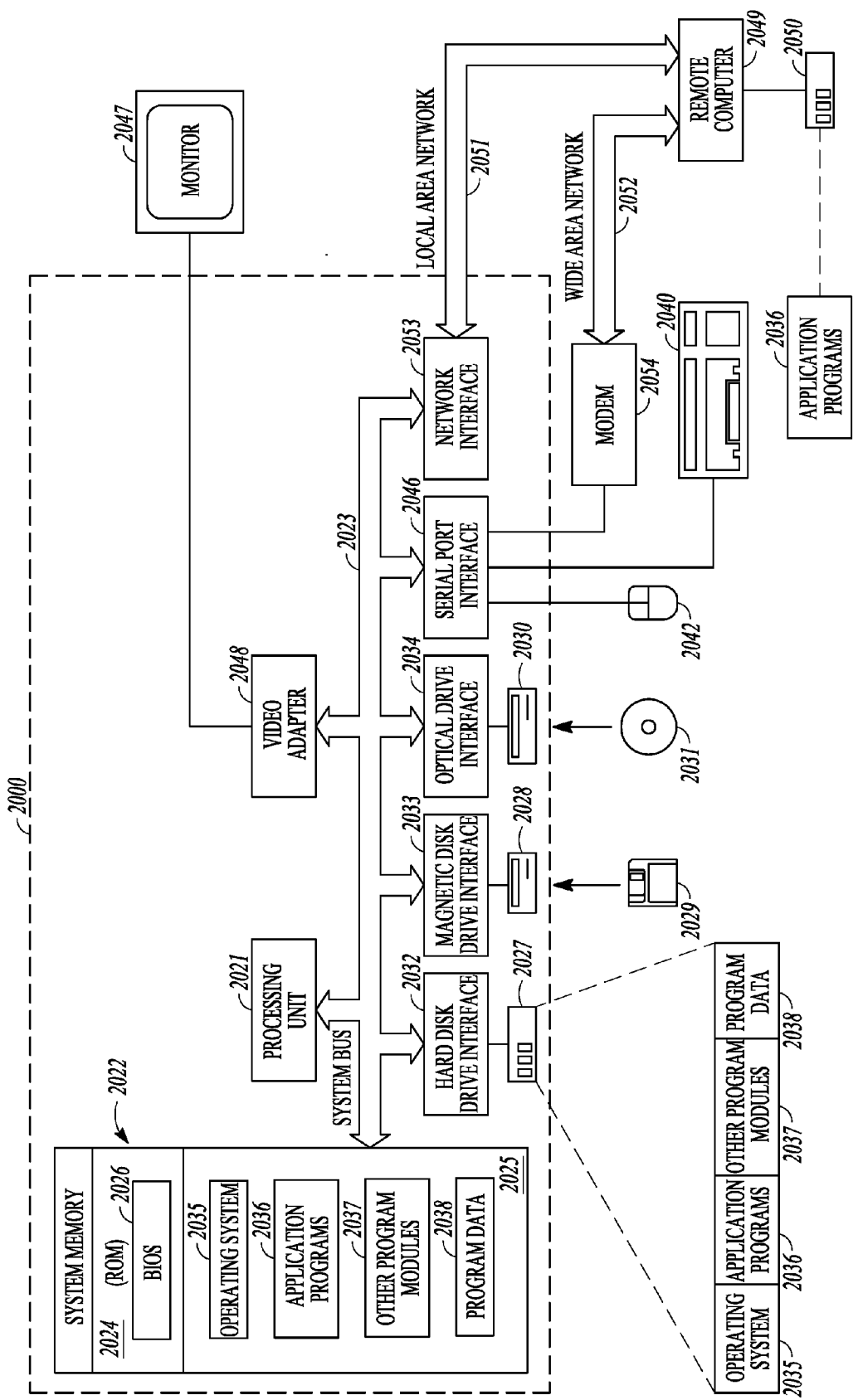
FIG. 20 is block diagram of a computer system for executing applications and performing methods according to an example embodiment.

FIG. 20 is block diagram of a computer system for executing applications and performing methods according to an example embodiment. In the embodiment shown in FIG. 20, a hardware and operating environment is provided that is applicable to any of the servers and/or remote clients shown in the other Figures.

As shown in FIG. 20, one embodiment of the hardware and operating environment includes a general purpose computing device in the form of a computer 2000 (e.g., a personal computer, workstation, or server), including one or more processing units 2021, a system memory 2022, and a system bus 2023 that operatively couples various system components including the system memory 2022 to the processing unit 2021. There may be only one or there may be more than one processing unit 2021, such that the processor of computer 2000 comprises a single central processing unit (CPU), or a plurality of processing units, commonly referred to as a multiprocessor or parallel-processor environment. In various embodiments, computer 2000 is a conventional computer, a distributed computer, or any other type of computer.

The system bus 2023 can be any of several types of bus structures including a memory bus or money controller, a peripheral bus, and a local bus using any of a variety of bus architectures. The system memory can also be referred to as simply the memory, and, in some embodiments, includes read-only memory (ROM) 2024 and random-access memory (RAM) 2025. A basic input/output system (BIOS) program 2026, containing the basic routines that help to transfer information between elements within the computer 2000, such as during start-up, may be stored in ROM 2024. The computer 2000 further includes a hard disk drive 2027 for reading from and writing to a hard dish, not shown, a magnetic disk drive 2028 for reading from or writing to a removable magnetic disk 2029, and an optical disk drive 2030 for reading from or writing to a removable optical disk 2031 such as a CD ROM or other optical media.

The hard disk drive 2027, magnetic disk drive 2028, and optical disk drive 2030 couple with a hard disk drive interface 2032, a magnetic disk drive interface 2033, and an optical disk drive interface 2034, respectively. The drives and their associated computer-readable media provide non volatile storage of computer-readable instructions, data structures, program modules and other data for the computer 2000. It should be appreciated by those skilled in the art that any type of computer-readable media which can store data that is accessible by a computer, such as magnetic cassettes, flash memory cards, digital video disks, Bernoulli cartridges, random access memories (RAMs), ready only memories (ROMs), redundant arrays of independent disks (e.g., RAID storage devices) and the like, can be used in the exemplary operating environment.

A plurality of program modules can be stored on the hard disk, magnetic disk 2029, optical disk 2031, ROM 2024, or RAM 2025, including an operating system 2035, one or more application programs 2036, other program modules 2037, and program data 2038. Programming for implementing one or more processes or method described herein may be resident on any one or number of these computer-readable media.

A user may enter commands and information into computer 2000 through input devices such as a keyboard 2040 and pointing device 2042. Other input devices (not shown) can include a microphone, joystick, game pad, satellite dish, scanner, or the like. These other input devices are often connected to the processing unit 2021 through a serial port interface 2046 that is coupled to the system bus 2023, but can be connected by other interfaces, such as a parallel port, game port, or a universal serial bus (USB). A monitor 2047 or other type of display device can also be connected to the system bus 2023 via an interface, such as a video adapter 2048. The monitor 2047 can display a graphical user interface for the user. In addition to the monitor 2047, computers typically include other peripheral output devices (not shown), such as speakers and printers.

The computer 2000 may operate in a networked environment using logical connections to one or more remote computers or servers, such as remote computer 2049. These logical connections are achieved by a communication device coupled to or a part of the computer 2000; the invention is not limited to a particular type of communications device. The remote computer 2049 can be another computer, a server, a router, a network PC, a client, a peer device or other common network node, and typically includes many or all of the elements described above I/O relative to the computer 2000, although only a memory storage device 2050 has been illustrated. The logical connections depicted in FIG. 20 include a local area network (LAN) 2051 and/or a wide area network (WAN) 2052. Such networking environments are commonplace in office networks, enterprise-wide computer networks, intranets and the internet, which are all types of networks.

When used in a LAN-networking environment, the computer 2000 is connected to the LAN 2051 through a network interface or adapter 2053, which is one type of communications device. In some embodiments, when used in a WAN-networking environment, the computer 2000 typically includes a modem 2054 (another type of communications device) or any other type of communications device, e.g., a wireless transceiver, for establishing communications over the wide-area network 2052, such as the internet. The modem 2054, which may be internal or external, is connected to the system bus 2023 via the serial port interface 2046. In a networked environment, program modules depicted relative to the computer 2000 can be stored in the remote memory storage device 2050 of remote computer, or server 2049. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one or ordinary skill in the art.

EXAMPLES

1. An example method comprising:
receiving communications from an application server at a touchscreen based mobile device, wherein the communications are tailored for providing a user interface for a workstation computer system;
translating the received communications at the mobile device into a mobile device user interface tailored for the mobile device touchscreen;
receiving user interactions via the mobile device touchscreen;
translating the received user interactions into corresponding workstation based user interactions; and
transmitting the translated user interaction to the application server such that the application server interacts with the mobile device in the same manner as with workstations.

2. The method of example 1 wherein the mobile device connects to the server via a wireless access point.

3. The method of example 1 wherein the mobile device facilitates signing on to the application server using a same user id and password as used when signing on via a workstation computer system.

4. The method of example 3 wherein the user id and password entered in the mobile device are translated to be identical with the same user id and password when entered via a workstation computer system.

5. The method of example 1 wherein the mobile device user interface provides tap-able thumbnail images of stored views.

6. The method of example 5 wherein the stored view thumbnail image are scrollable via finger gestures.

7. The method of example 5 and further comprising:
receiving a notification of a shared view that includes an icon of the shared view; and
importing the shared view into the stored views via a touch of the touchscreen.

8. The method of example 5 and further comprising executing a view with real-time data.

9. The method of example 5 and further comprising displaying a view as a graph responsive to a finger gesture via the touchscreen user interface.

10. The method of example 5 and further comprising displaying a view as a graph responsive to a finger gesture via the touchscreen user interface.

11. The method of example 1 and further comprising providing a keyboard interface on the touchscreen to facilitate user input of text.

12. The method of example 1 wherein the application server is executing a business warehouse application and wherein the mobile device user interface provides for browsing of available queries, filtering of displayed queries, and searching and displaying metadata associated with queries.

13. The method of example 12 wherein the mobile device user interface facilitates user searching and selection of variables.

14. The method of example 13 wherein the mobile device user interface provides and facilitates adapting tabular views.

15. The method of example 12 wherein the mobile device user interface facilitates storing and sharing of views.

16. An example method comprising:
receiving communications from an application server at a touchscreen based mobile device, wherein the communications are tailored for providing a pull-down menu based user interface tailored for a workstation computer system;
translating the received communications at the mobile device into a mobile device user interface tailored for the mobile device touchscreen with dragable icons;
receiving user touch based interactions via the mobile device touchscreen;
translating the received user interactions into corresponding workstation pull down menu based user interactions; and
transmitting the translated user interaction to the application server such that the application server interacts with the mobile device in the same manner as with workstations.

17. The method of example 16 wherein the mobile device user interface provides tap-able thumbnail images of stored views that are scrollable via finger gestures, and wherein the method further comprises:
receiving a notification of a shared view that includes an icon of the shared view; and
importing the shared view into the stored views via a touch of the touchscreen.

18. An example mobile device comprising:
a processor;
a touchscreen interface coupled to the processor;
a transceiver coupled to the processor to communicate with an application server via a wireless access point;
a memory coupled to the processor, the memory having instructions stored thereon to cause the processor to:
receive communications from the application server, wherein the communications are tailored for providing a user interface for a workstation computer system;
translate the received communications into a mobile device user interface tailored for the mobile device touchscreen;
receive user interactions via the mobile device touchscreen;
translate the received user interactions into corresponding workstation based user interactions; and transmit the translated user interaction to the application server such that the application server interacts with the mobile device in the same manner as with workstations.

19. The mobile device of example 18 wherein the mobile device user interface provides tap-able thumbnail images of stored views that are scrollable via finger gestures, and wherein the mobile device is further adapted to:

receive a notification of a shared view that includes an icon of the shared view; and import the shared view into the stored views via a touch of the touchscreen.

20. The mobile device of example 18 wherein the application server is executing a business warehouse application and wherein the mobile device user interface provides for browsing of available queries, filtering of displayed queries, and searching and displaying metadata associated with queries.

Although a few embodiments have been described in detail above, other modifications are possible. For example, the logic flows depicted in the figures doe not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving, at a touchscreen based mobile device, communications from an application server that are tailored for providing a user interface for a workstation computer system;
translating, at the mobile device, the received communications tailored for providing a user interface for a workstation computer system, into a mobile device user interface tailored for the mobile device touchscreen;
receiving, via the mobile device touchscreen, user interactions with the mobile device interface tailored for the mobile device touchscreen;
translating the received user interactions with the mobile device interface tailored for the mobile device touchscreen, into corresponding workstation based user interactions of an interface for a workstation computer system; and
transmitting the translated user interactions to the application server such that the application server interacts with the mobile device in the same manner as with a workstation computer system.

2. The method of claim 1 wherein the mobile device connects to the server via a wireless access point.

3. The method of claim 1 wherein the mobile device facilitates signing on to the application server using a same user id and password as used when signing on via a workstation computer system.

4. The method of claim 3 wherein the user id and password entered in the mobile device are translated to be identical with the same user id and password when entered via a workstation computer system.

5. The method of claim 1 wherein the mobile device user interface provides tap-able thumbnail images of stored views.

6. The method of claim 5 wherein the stored view thumbnail images are scrollable via finger gestures.

7. The method of claim 5 and further comprising:
receiving a notification of a shared view that includes an icon of the shared view; and
importing the shared view into the stored views via a touch of the touchscreen.

8. The method of claim 5 and further comprising executing a view with real-time data.

9. The method of claim 5 and further comprising modifying filters for a dimension of a view.

10. The method of claim 5 and further comprising displaying a view as a graph responsive to a finger gesture via the touchscreen user interface.

11. The method of claim 1 and further comprising providing a keyboard interface on the touchscreen to facilitate user input of text.

12. The method of claim 1 wherein the application server is executing a business warehouse application and wherein the mobile device user interface provides for browsing of available queries, filtering of displayed queries, and searching and displaying metadata associated with queries.

13. The method of claim 12 wherein the mobile device user interface facilitates user searching and selection of variables.

14. The method of claim 13 wherein the mobile device user interface provides and facilitates adapting tabular views.

15. The method of claim 12 wherein the mobile device user interface facilitates storing and sharing of views.

16. A method comprising:
receiving, at a touchscreen based mobile device, communications from an application server that are tailored for providing a pull-down menu based user interface tailored for a workstation computer system;
translating, at the mobile device, the received communications tailored for providing a pull-down menu based user interface tailored for a workstation computer system into a mobile device user interface tailored for the mobile device touchscreen with dragable icons;
receiving, via the mobile device touchscreen, user touch based interactions with the mobile device interface tailored for the mobile device touchscreen with dragable icons;
translating the received user interactions with the mobile device interface tailored for the mobile device touchscreen with dragable icons into corresponding workstation pull-down menu based user interactions of an interface for a workstation computer system; and
transmitting the translated user interactions to the application server such that the application server interacts with the mobile device in the same manner as with a workstation computer system.

17. The method of claim 16 wherein the mobile device user interface provides tap-able thumbnail images of stored views that are scrollable via finger gestures, and wherein the method further comprises:
receiving a notification of a shared view that includes an icon of the shared view; and
importing the shared view into the stored views via a touch of the touchscreen.

18. A mobile device comprising:
a processor;
a touchscreen interface coupled to the processor;
a transceiver coupled to the processor to communicate with an application server via a wireless access point;
a memory coupled to the processor the memory having instructions stored thereon to cause the processor to perform operations comprising:
receiving communications from the application server that are tailored for providing a user interface for a workstation computer system;

translating the received communications into a mobile device user interface tailored for the mobile device touchscreen;

receiving, via the mobile device touchscreen user interactions with the mobile device interface tailored for the mobile device touchscreen;

translating the received user interactions with the mobile device interface tailored for the mobile device touchscreen into corresponding workstation based user interactions of an interface for a workstation computer system, and transmitting the translated user interactions to the application server such that the application server interacts with the mobile device in the same manner as with a workstation computer system.

19. The mobile device of claim 18 wherein the mobile device user interface provides tap-able thumbnail images of stored views that are scrollable via finger gestures, and wherein the operations further comprise:

receiving a notification of a shared view that includes an icon of the shared view; and importing the shared view into the stored views via a touch of the touchscreen.

20. The mobile device of claim 18 wherein the application server is executing a business warehouse application and wherein the mobile device user interface provides for browsing of available queries, filtering of displayed queries, and searching and displaying metadata associated with queries.

* * * * *